US012656599B2

(12) United States Patent
Aljasem et al.

(10) Patent No.:    US 12,656,599 B2
(45) Date of Patent:        Jun. 16, 2026

(54) CONFIGURABLE LIGHT EMISSION BY SELECTIVE BEAM-SWEEPING

(71) Applicant: Cognex Corporation, Natick, MA (US)

(72) Inventors: Khaled Aljasem, Bad Krozingen (DE); Florian Eggert, Freiburg (DE); Thomas Ruhnau, Herbolzheim (DE); André Schweier, Freiburg (DE); John Filhaber, Norwich, CT (US)

(73) Assignee: Cognex Corporation, Natick, MA (US)

( * ) Notice: Subject to any disclaimer, the term of this patent is extended or adjusted under 35 U.S.C. 154(b) by 643 days.

(21) Appl. No.: 18/172,750

(22) Filed: Feb. 22, 2023

(65) Prior Publication Data

US 2023/0273427 A1     Aug. 31, 2023

Related U.S. Application Data

(60) Provisional application No. 63/314,304, filed on Feb. 25, 2022.

(51) Int. Cl.
| | |
|---|---|
| *G02B 26/10* | (2006.01) |
| *G02B 26/08* | (2006.01) |
| *G02B 27/28* | (2006.01) |
| *H04N 23/56* | (2023.01) |

(52) U.S. Cl.
CPC ....... *G02B 26/101* (2013.01); *G02B 26/0808* (2013.01); *G02B 26/0833* (2013.01); *G02B 27/285* (2013.01); *H04N 23/56* (2023.01)

(58) Field of Classification Search
None
See application file for complete search history.

(56) References Cited

U.S. PATENT DOCUMENTS

| | | | | | |
|---|---|---|---|---|---|
| 6,053,409 | A | * | 4/2000 | Brobst ............... | G06K 7/10831 |
| | | | | | 235/462.37 |
| 9,696,137 | B2 | | 7/2017 | Braker et al. | |
| 10,295,827 | B1 | * | 5/2019 | Chao ..................... | H04N 23/60 |

(Continued)

FOREIGN PATENT DOCUMENTS

| | | |
|---|---|---|
| JP | 6685569 | 4/2020 |
| WO | WO 2020/020799 | 1/2020 |
| WO | WO 2020/178813 | 9/2020 |

OTHER PUBLICATIONS

International Preliminary Report on Patentability in International Appln. No. PCT/US2023/013644, mailed on Sep. 6, 2024, 7 pages.

(Continued)

*Primary Examiner* — Robert E. Tallman
(74) *Attorney, Agent, or Firm* — Fish & Richardson P.C.

(57)                    ABSTRACT

An opto-electronic system includes a laser operable to produce a laser beam; an optical element including two or more beam-shaping portions, each of the two or more beam-shaping portions having a different optical property; a beam deflector arranged to sweep the laser beam across the optical element to produce output light; and electronics communicatively coupled with the laser, the beam deflector, or both the laser and the beam deflector. The electronics are configured to cause selective impingement of the laser beam onto a proper subset of the two or more beam-shaping portions of the optical element to modify one or more optical parameters of the output light.

23 Claims, 19 Drawing Sheets

(56) References Cited

U.S. PATENT DOCUMENTS

| | | | |
|---|---|---|---|
| 10,620,477 B2 | 4/2020 | Li et al. | |
| 10,795,164 B1 | 10/2020 | Chao et al. | |
| 10,812,727 B1 * | 10/2020 | Kempf | H04N 23/69 |
| 11,036,057 B2 | 6/2021 | Filhaber | |
| 11,314,100 B2 | 4/2022 | Parrett et al. | |
| 11,487,130 B2 | 11/2022 | Filhaber | |
| 2008/0297731 A1 | 12/2008 | Powell et al. | |
| 2012/0257279 A1 | 10/2012 | Hsieh | |
| 2018/0129055 A1 * | 5/2018 | Morrison | G02B 5/32 |
| 2019/0227336 A1 | 7/2019 | Parrett et al. | |

OTHER PUBLICATIONS

International Search Report and Written Opinion in International Appln. No. PCT/US2023/013644, mailed on Jun. 16, 2023, 13 pages.

* cited by examiner

400

402a     402b     402c     402d     402e     402f 406     408     410     412     414

406

1400

CONFIGURABLE LIGHT EMISSION BY SELECTIVE BEAM-SWEEPING

CROSS REFERENCE TO RELATED APPLICATIONS

This application claims the benefit of priority under 35 U.S.C. § 119(e)(1) of U.S. Provisional Application No. 63/314,304, filed on Feb. 25, 2022, which is incorporated by reference herein.

FIELD OF THE DISCLOSURE

Technologies are described for producing light having desired optical characteristics by selective illumination of an optical element with a swept laser beam.

BACKGROUND

Laser light is projected onto objects to form patterns for imaging. The optical characteristics of the laser light, such as intensity, polarization, focal distance, and pattern, depend on the application for which the laser light is being used. For example, for depth sensing of an object, a dot array is projected onto the object. Illumination lines (e.g., resulting from a fan-shaped laser beam) can be used for applications such as surveying, targeting, leveling, and three-dimensional (3D) imaging. Because different applications can require different optical characteristics, multiple laser projection systems can be provided, each corresponding to a different use-case.

SUMMARY

Technologies described herein use a laser in conjunction with a beam deflector to sweep a laser beam across an optical element having multiple beam-shaping portions. The laser, the beam deflector, or both, are controlled so that the laser beam impinges on a proper subset of the multiple beam-shaping portions to produce output light having desired properties corresponding to the proper subset of the multiple beam-shaping portions. By appropriate adjustment of various laser beam properties and/or sweep properties, output light having a wide variety of optical properties can be obtained.

According to one aspect of the disclosed technologies, an opto-electronic system includes a laser operable to produce a laser beam; an optical element including two or more beam-shaping portions, each of the two or more beam-shaping portions having a different optical property; a beam deflector arranged to sweep the laser beam across the optical element to produce output light; and electronics communicatively coupled with the laser, the beam deflector, or both the laser and the beam deflector. The electronics are configured to cause selective impingement of the laser beam onto a proper subset of the two or more beam-shaping portions of the optical element to modify one or more optical parameters of the output light.

The foregoing and other implementations according to this disclosure can each optionally include one or more of the following features, alone or in combination. The following features, alone or in combination, can be included in implementations of the subsequently-referenced aspect of this disclosure that described a method.

In some implementations, the two or more beam-shaping portions include distinct beam-shaping portions.

In some implementations, the distinct beam-shaping portions are arrayed in two dimensions.

In some implementations, the electronics are configured to obtain data indicating the proper subset of the two or more beam-shaping portions. The proper subset of the two or more beam-shaping portions has optical properties that provide a selected optical parameter. The electronics are configured to cause selective impingement of the laser beam onto the proper subset of the two or more beam-shaping portions by control of the laser, the beam deflector, or both the laser and the beam deflector.

In some implementations, the electronics include a laser controller configured to switch the laser to be on when the beam deflector is in a configuration to deflect the laser beam onto the proper subset of the two or more beam-shaping portions, and switch the laser to be off when the beam deflector is in a configuration to deflect the laser beam onto another beam-shaping portion of the optical element that is distinct from the proper subset of the two or more beam-shaping portions.

In some implementations, the other beam-shaping portion is arranged between distinct sections of the proper subset of the two or more beam-shaping portions.

In some implementations, the electronics include a laser controller configured to alter an emission power of the laser between different on-state powers as the beam deflector sweeps the laser beam, such that different sections of the proper subset of the two or more beam-shaping portions are impinged with different laser beam powers.

In some implementations, the electronics include a deflector controller configured to alter a sweep range of the beam deflector from a first sweep range to a second, different sweep range. The second sweep range deflects the laser beam onto the proper subset of the two or more beam-shaping portions.

In some implementations, the opto-electronic system includes a lens arranged between the beam deflector and the optical element, the lens configured to collimate the laser beam deflected by the beam deflector to produce parallel laser beams for different deflection directions, the parallel laser beams oriented towards the optical element.

In some implementations, the optical element includes a single printed optic that includes the two or more beam-shaping portions.

In some implementations, the different optical properties of the two or more beam-shaping portions include different focal distances.

In some implementations, the one or more optical parameters include a shape of the output light as projected onto an object.

In some implementations, the one or more optical parameters include a projection direction of the output light.

In some implementations, the one or more optical parameters include a fan angle of the output light.

In some implementations, the one or more optical parameters include a pattern of structured light in the output light.

In some implementations, the pattern includes at least one of a two-dimensional phase-shift pattern, a two-dimensional dot pattern, or a stripe pattern.

In some implementations, the one or more optical parameters include a polarization of the output light.

In some implementations, the output light is configured to form one or more illumination lines, and the one or more optical parameters include at least one of a number of the one or more illumination lines, positions of the one or more illumination lines, lengths of the one or more illumination lines, or spacings between adjacent illumination lines of the one or more illumination lines.

In some implementations, the two or more beam-shaping portions include diffractive optical elements.

In some implementations, the two or more beam-shaping portions include optical diffusers.

In some implementations, the beam deflector includes a micro-electromechanical system (MEMS) mirror.

In some implementations, the opto-electronic system includes a camera sensor arranged to image an object onto which the output light is projected.

In some implementations, the electronics include an image processor configured to receive an image captured by the camera sensor; determine a pattern of the output light projected onto the object; and based on the pattern, determine a surface topology of the object.

In some implementations, the electronics include a deflector controller configured to adjust at least one of a sweep frequency or a sweep speed of the beam deflector.

In some implementations, the electronics include a deflector controller configured to adjust a sweep range of the beam deflector from a first sweep range to a second, different sweep range, wherein the first sweep range deflects the laser beam onto a first impingement path on a first beam-shaping portion, and wherein the second sweep range deflects the laser beam onto a second, different impingement path on the first beam-shaping portion.

In some implementations, the optical element includes a beam-blocking element arranged between a first beam-shaping portion and a second beam-shaping portion.

A second aspect of this disclosure describes a method. The method includes controlling a laser to emit a laser beam; controlling a beam deflector to sweep the laser beam across an optical element to produce output light; and obtaining data indicating a proper subset of two or more beam-shaping portions of the optical element to be impinged on with the laser beam. Each of the two or more beam-shaping portions has a different optical property, and the proper subset of the two or more beam-shaping portions has optical properties that provide a selected optical parameter of the output light. The method includes controlling the laser, the beam deflector, or both the laser and the beam deflector to cause selective impingement of the laser beam onto the proper subset of the two or more beam-shaping portions.

The foregoing and other implementations according to this disclosure can each optionally include one or more of the following features, alone or in combination.

In some implementations, obtaining the data indicating the proper subset includes receiving data indicating the selected optical parameter; and determining the proper subset based on the selected optical parameter.

In some implementations, obtaining the data indicating the proper subset includes receiving data indicating a current application in which the output light is to be used; determining the selected optical parameter based on the current application; and determining the proper subset based on the selected optical parameter.

In some implementations, the method includes controlling a camera sensor to capture an image of an object onto which the output light is projected; determining a pattern of the output light projected onto the object based on the image; and, based on the pattern, determining a surface topology of the object.

Particular aspects of the disclosed technologies can be implemented to realize one or more of the following potential advantages. In some implementations, a number of separate optical elements used to provide different types of output light can be reduced, because an optical element has multiple beam-shaping portions that can modify light in different ways to provide the different types of output light. In some implementations, a compactness and simplicity of a light emitting system can be increased, because laser light emitted from a single laser can be transmitted along a substantially identical beam path, save for different deflection angles, to impinge on a common optical element to produce light having different optical characteristics. In some implementations, precise temporal alignment can be used for flexible optical light output, providing improved system simplicity and reliability compared to spatial optical alignment with more complex optical systems. In some implementations, output light control can be improved, because a collimating lens causes orthogonal impingement for laser beams deflected at different angles. In some implementations, speckle in projected patterns can be reduced and eye safety can be improved, because direct and indirect light interference is averaged out as a laser beam sweeps along one or more beam-shaping portions of an optical element. In some implementations, complex superpositions of optical patterns can be generated in a highly configurable manner, because beam deflector adjustment, synchronized laser switching, or both, can provide highly controllable selective impingement of laser light on specific portions of optical elements. In some implementations, output light can be configured for interoperability with an imaging and image analysis process, improving the accuracy and reliability of the analysis.

Details of one or more implementations of the disclosed technologies are set forth in the accompanying drawings and the description below. Other features, aspects, descriptions and potential advantages will become apparent from the description, the drawings and the claims.

Certain illustrative aspects of the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

Figure 1:
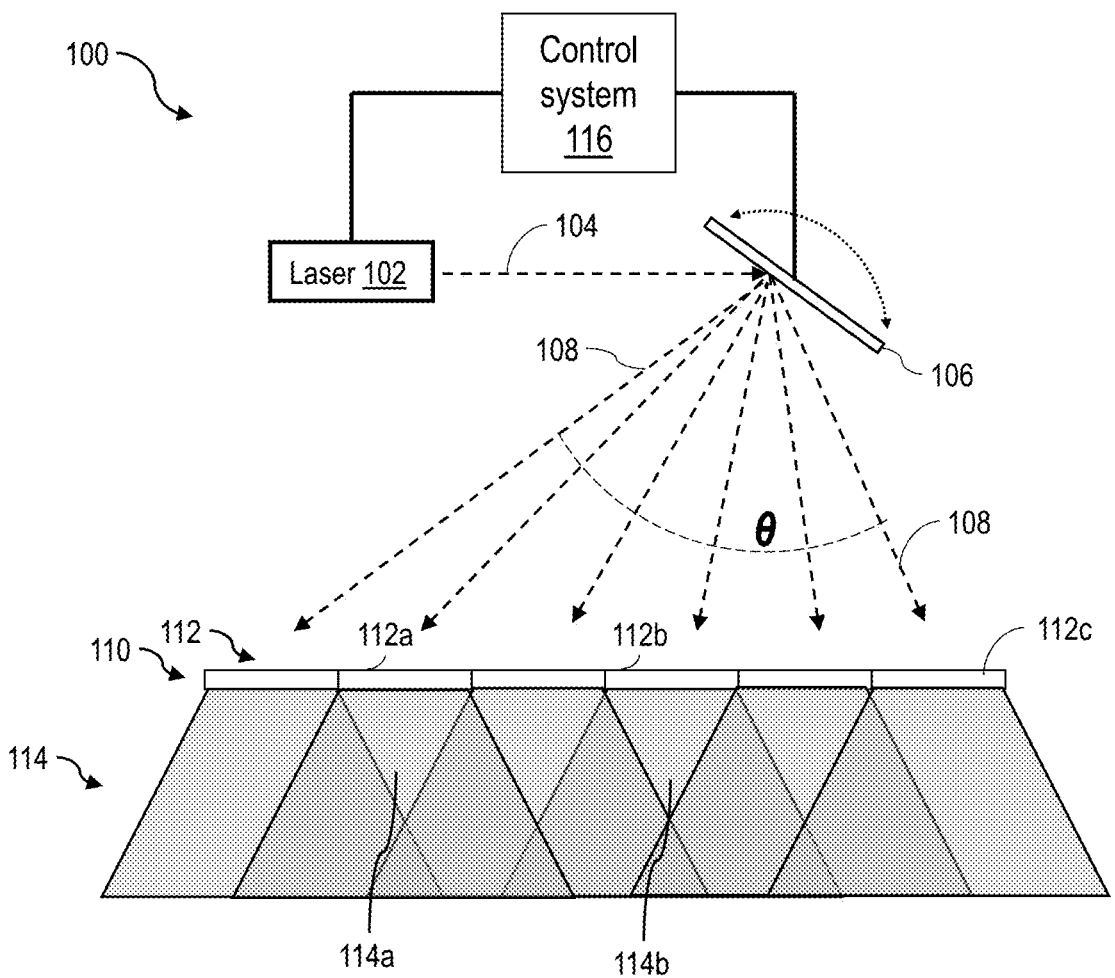
FIG. 1 is a diagram illustrating an example of an opto-electronic system that uses a beam deflector to selectively illuminate an optical element.

FIG. 1A shows an example of an opto-electronic system 100 that uses a selectively-swept laser beam to produce light having one or more desired characteristics. The opto-electronic system 100 includes a laser 102 that is arranged and configured to emit laser light as an input laser beam 104 towards a beam deflector 106. The beam deflector 106 is arranged and configured to receive the input laser beam 104 and reflect it as a reflected laser beam 108 towards an optical element 110. An angular configuration of the beam deflector 106 can be adjusted in a reciprocating (e.g., rotational) motion along one or more axes, to sweep the reflected laser beam 108 over a range of angles θ.

The optical element 110 includes multiple beam-shaping portions, such as optical element portions 112a, 112b, and 112c, collectively referred to as beam-shaping portions 112. The beam-shaping portions 112, which can be arranged in a line (optical beam-shaping portions positioned in a row), in a two-dimensional array (optical beam-shaping portions positioned over an area), or in another arrangement, include two or more beam-shaping portions 112 (and in some implementations, all of the beam-shaping portions 112) having different respective optical properties that cause modification of one or more optical properties of the reflected laser beam 108. Accordingly, the opto-electronic system 100 produces output light 114 representing the reflected laser beam 108 modified by the optical element 110, with parameters of the output light 114 dependent on which beam-shaping portion(s) were illuminated by the reflected laser beam 108. For example, beam-shaping portion 112a modifies the reflected laser beam 108 to produce output light 114a, while beam-shaping portion 112b modifies the reflected laser beam 108 to produce output light 114b, where output light 114a and 114b can differ in one or more optical parameters.

The opto-electronic system 100 includes a control system 116 such as a microcontroller, a programmed field-programmable gate array, a microprocessor, another computing system, or a combination of the foregoing items. The control system 116 is communicatively coupled to the laser 102 and to the beam deflector 106 so as to control the laser 102 and/or the beam deflector 106 by transmitting appropriate signals (e.g., current and/or voltage signals) to the laser 102 and/or the beam deflector 106. For example, the control system 116 can be configured to turn the laser 102 on and off, to control an intensity of the input laser beam 104, to control the sweep angle range θ to be smaller/larger and/or to be aimed at different beam-shaping portions 112 of the optical element 110, and/or to control a sweep rate (cycle frequency) of the beam deflector 106. In some implementations, the control system 116 is communicatively coupled to a camera sensor, as described in more detail below. In some implementations, the control system 116 is configured to perform image analysis operations, as described in more detail below.

The laser 102 can be a solid state, diode-based device or another appropriate unit controllable to emit the input laser beam 104, which is temporally and spatially coherent. A wavelength of the laser light emitted by the laser 102 can be in the range of 400-2000 nm, such as visible, near-visible ultraviolet, and/or infrared. In some implementations, the laser 102 is controllable by the control system 116 to transmit the input laser beam 104 at variable wavelengths. In some implementations, the laser 102 is a single-mode or a multi-mode laser. In some implementations, the laser 102 is an on-chip light source. In some implementations, the laser 102 is a discrete light source attached to an optical printed circuit board or other mount for optical coupling to other components of the opto-electronic system 100.

The beam deflector 106 can include any suitable mechanical or solid-state mechanism for diverting the reflected path of the input laser beam 104. For example, the beam deflector 106 can be a microelectromechanical system (MEMS) mirror, a galvanometer mirror, an acousto-optic modulator (AOM), a piezoelectric-operated mirror, and/or another system configured to repeatedly and continuously sweep back and forth so as to direct the reflected laser beam 108 over the angular range θ (or a subset thereof). In some implementations, the beam deflector 106 includes lithium niobate (LiNbO₃), lithium tantalite (LiTaO₃), or another material useful in linear and non-linear optical applications.

The possible angular ranges θ over which the reflected laser beam 108 is swept can depend on the particular design and type of the beam deflector 106. In some implementations, the beam deflector 106 is configured to sweep over angular ranges of up to 20°, up to 30°, up to 40°, or another range. In some implementations, a center angle about which the beam deflector 106 is configured to sweep can be adjustable over a range of up to 70°, up to 60°, up to 50°, or another angular range. As a non-limiting example, the beam deflector 106 can have a mirror surface of approximately 1.0 millimeters (e.g., in a MEMS implementation of the beam deflector 106), or another size. In various implementations, a cycle frequency of the beam deflector 106 can vary and can be adjustable by the control system 116. As a non-limiting example, the beam deflector 106 can have a resonance frequency of 20 kHz. As one example, the beam deflector 106 can be a MEMS mirror having a multi-axis (two-degree of freedom) design that, by way of non-limiting example, is available from Opus Microsystems of Taiwan. Certain models (e.g. the OP-6111) have a fixed scan frequency of 22,000 Hz in a fast direction (+/−20 degrees) and 1,400 Hz in a slow direction (+/−15 degrees). Other mirrors (e.g. the OP-6200) support fast scan frequencies of 18,500 Hz (+/−22 degrees) and a controllable slow scan frequency (+/−12 degrees) using a voltage waveform signal As described in various examples below, the different beam-shaping portions 112 have different optical properties that modify the reflected laser beam 108 differently to impart different optical properties to the output light 114. For example, the different beam-shaping portions 112 can have different respective combinations of materials, thicknesses, refractive indexes, absorption coefficients, lens properties (e.g., a number of microlenses, a spacing of the microlenses in a microlens array, and/or a focal length of lenses/microlenses), feature patterns, upconversion/downconversion characteristics, polarization properties (e.g., polarization filtering and/or polarization rotation—a wave plate can be included that alters the polarization state of the laser beam), diffusing properties, or a combination thereof. The effects of these optical properties of the beam-shaping portions 112 are predictable and known (e.g., stored), such that desired optical properties of the output light 114 can be obtained by controlling the laser 102 and/or the beam deflector 106 to direct the reflected laser beam 108 to a proper subset of the beam-shaping portions 112 that will provide the desired optical properties, and to prevent impingement on other beam-shaping portions besides the proper subset.

Figure 4A:
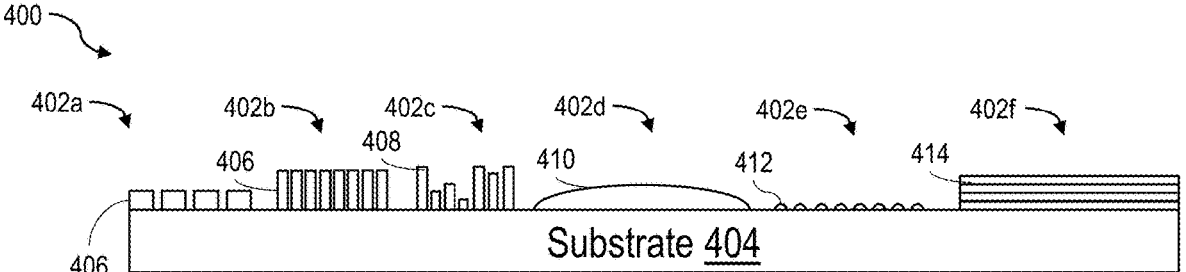
FIGS. 4A-4B are side-view diagrams illustrating examples of optical elements including multiple beam-shaping portions.

In some implementations, the optical element 110 is a printed optical element. For example, as shown in FIG. 4A, an optical element 400 includes beam-shaping portions 402a-402f (collectively referred to as beam-shaping portions 402). The optical element 400 can be a single printed optic 400. Each beam-shaping portion 402 includes structures formed by printing on a common substrate 404. For example, a printing process to fabricate an optical element can include deposition of a liquid film (e.g., a polymer film), imprinting of the film to form structures corresponding to a shape of a printing stamp, and curing to solidify the liquid. Alternatively, or in addition, a printing process can include additive manufacturing such as printing of a polymer (e.g., inkjet printing) and subsequent curing. Multiple printing phases can be used to fabricate multi-layer beam-shaping portions and/or to fabricate beam-shaping portions made of different materials from one another. The substrate 404 can be a glass substrate, a sapphire substrate, or another substrate. In some implementations, the substrate 404 is transparent to one or more wavelengths of light emitted by the laser of the opto-electronic system.

In the example optical element 400, beam-shaping portions 402a and 402b include microstructures 406, such as pillars (e.g., square, round, and/or rectangular pillars) in different lattice arrangements or walls in different geometries, e.g., forming closed loops, dashed lines, or waveguides. Spacings, sizes, and/or shapes of the microstructures 406 are different between beam-shaping portion 402a and beam-shaping portion 402b, such that the beam-shaping portions 402a and 402b modify light differently from one another. Arrangements of the microstructures 406 can be regular or irregular/varied. The microstructures 406 can have dimensions on the micron and/or nanometer scale, such as less than 100 µm, less than 10 µm, less than 1 µm, less than 100 nm, or less than 10 nm. Suitable types and arrangements of microstructures can perform polarization modification/filtering, pattern generation, aggregate lensing (metasurface lensing), optical diffusing, beam deflection, and other optical operations. In some implementations, the microstructures 406 form one or more diffractive optical elements (DOEs). For example, a DOE can be a diffractive beam-splitter, such as for structured light generation; a diffractive diffuser; or a diffractive beam-shaper. Moreover, the DOEs can include integrated focusing properties.

In some implementations, microstructures or structures included in beam-shaping portions form anamorphic and/or freeform optical elements. Anamorphic optical elements can provide non-spherical light projection, e.g., to "squeeze" an optical pattern projected onto an object. In some implementations, anamorphic optical elements include spherical, aspherical, and/or toroidal surfaces. Freeform optics have few or no symmetries (e.g., no rotational symmetry) and can be used to modify light in highly customizable ways, often with the aid of computer simulation to determine a shape of a surface.

Beam-shaping portion 402c includes a random cylinder array of cylinders 408. As described in further detail below, random cylinder arrays can act as linear diffusers to project diffused light (e.g., illumination lines) from the optical element 400. Beam-shaping portion 402d includes a single printed lens 410 configured to focus light. In various implementations, beam-shaping portions can be configured to provide focused and/or divergent light, e.g., by the inclusion of concave lenses, convex lenses, Powell lenses, cylindrical lenses, and other lens types. In some implementations, a beam-shaping portion includes a Fresnel structure, such as multiple concentric annular sections that form a Fresnel lens. Beam-shaping portion 402e includes an array of microlenses 412. The microlenses 412 together modify impinging laser beams to produce structured light, such as dot arrays (one-dimensional (1D) or two-dimensional (2D)). In various implementations, various arrangements of printed structures can be provided to form beam-shaping portions that produce patterns such as 2D striped (Gray code) patterns or 2D phase-shift patterns. Beam-shaping portion 402f includes a multi-layer structure 414 having different layers made of different materials. The multi-layer structure 414 can be configured to perform one or more optical functions, such as polarization modification/filtering, pattern generation, aggregate lensing (metasurface lensing), optical diffusing, beam deflection, and other optical operations. For example, a multi-layer or single layer structure (e.g., formed of a birefringent material) can form a waveplate that alters a polarization of the laser beam, Sizes of each beam-shaping portion 402 and of the optical element 400 can vary in various implementations. In some implementations, each beam-shaping portion 402 has dimensions of between 1 mm and 10 mm, e.g., about 5 mm. For an optical element 400 including a one-dimensional row of beam-shaping portions 402, the optical element 400 can have a width of between 1 mm and 10 mm and a length defined by the row of beam-shaping portions 402.

The inclusion of the multiple beam-shaping portions 402 on the shared substrate 404 can simplify design and operation of the opto-electronic system 100 compared to systems that include separate, discrete optical components for modifying light in different ways. The shared substrate 404 can be configured so that a surface of the shared substrate 404 on which beam-shaping portions are arranged (e.g., in a row or an array) can be orthogonal to a propagation direction of laser beams impinging on the surface. As described in further detail below, in some implementations, this can allow for perpendicular impingement of laser beams on each beam-shaping portion, regularizing the beam-shaping portions' optical effects. Moreover, the common substrate 404 allows for adjacent and/or close placement of the beam-shaping portions 402, reducing space requirements and improving system compactness.

In addition, total component count can be reduced by the combination of what might otherwise be separate, discrete optical elements into the combined optical element 400. For example, compared to systems that could use multiple lasers and/or multiple collimators (e.g., in combination with a beam combiner) to produce different types/patterns of output light, systems according to this disclosure can achieve reconfigurable optical output using a single laser in combination with a controlled beam deflector and/or controlled on/off switching of the single laser. This can improve system compactness and reduce cost and weight. Relatedly, the integration of multiple beam-shaping portions into a combined optical element allows for laser beams traveling along a substantially shared path (except for variations caused by different deflection angles) to impinge upon the optical element, reducing a number of necessary beam splitters, beam combiners, and other beam-steering components.

In some implementations, fabrication costs and complexity can be reduced through joint fabrication of multiple beam-shaping portions 402. For example, multiple beam-shaping portions can be formed in a joint printing step using a stamp having structures that form the multiple beam-shaping portions.

Some implementations according to this disclosure include an optical element in which at least some of the beam-shaping portions are separate from one another, e.g., on separate substrates, not attached to one another, or otherwise not combined into a unified printed optical element. In some implementations, one or more beam-shaping portions are combined into a printed optical element, and one or more other beam-shaping portions are provided separately from the printed optical element.

Some implementations according to this disclosure optionally include a collimating lens. For example, the opto-electronic system 200 shown in FIG. 2 includes a collimating lens 202. Other components of the opto-electronic system 200 can have characteristics as described for corresponding components of the opto-electronic system 100. Here, the beam deflector 106 is configured and arrange to reflect the input laser beam 104 towards the collimating lens 202. The reflected laser beams 108, which for different reflection directions of the beam deflector 106 can be represented as diverging light traveling from the beam deflector 106, are collimated by the collimating lens 202. The collimating lens 202 is configured and arranged to direct the resulting collimated laser beams 204 (multiple parallel laser beams corresponding to different reflection directions of the beam deflector 106) towards the optical element 110. For example, the collimating lens 202 can have a focal length that matches a distance between the collimating lens 202 and the beam deflector 106.

Figure 2:
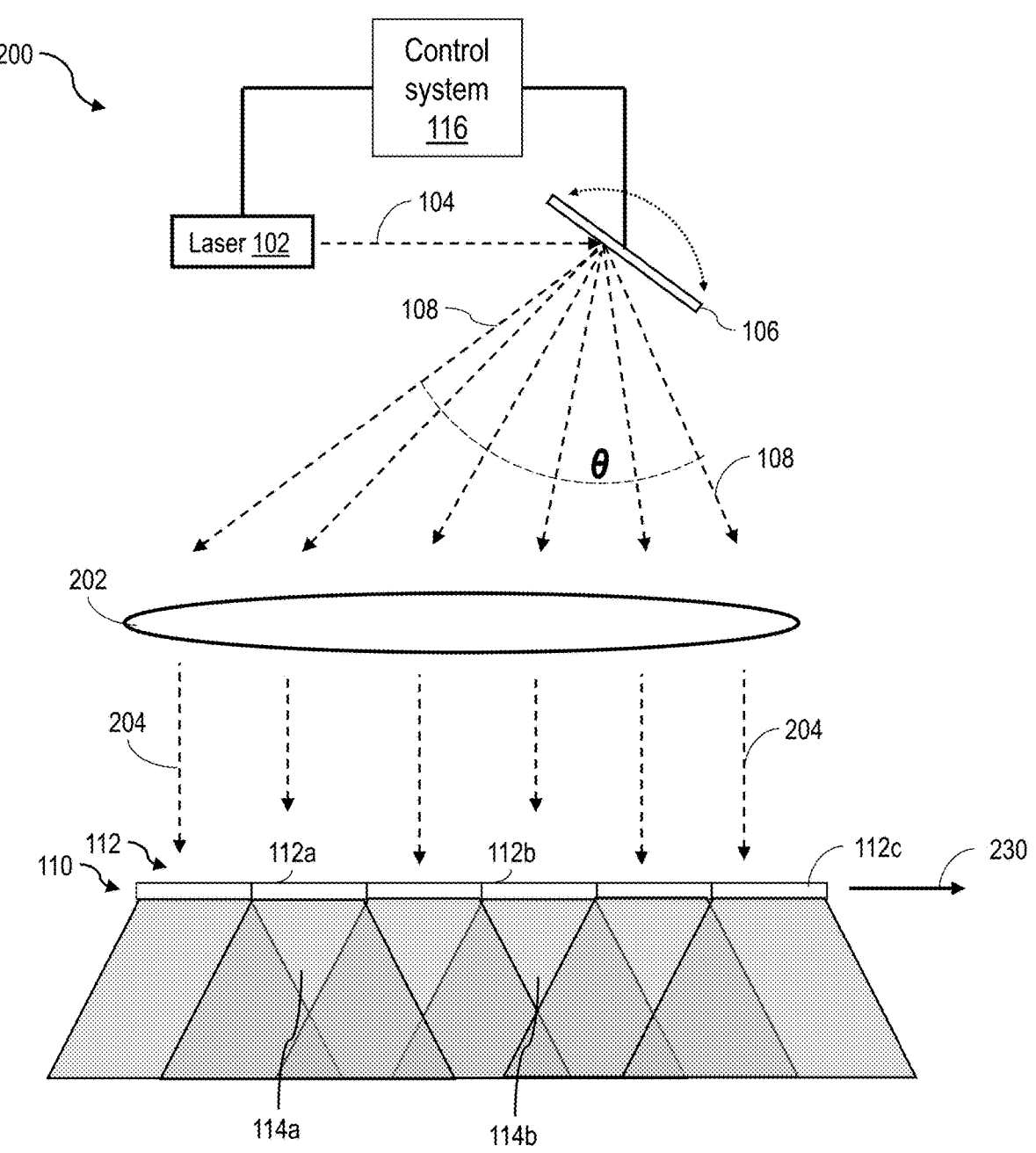
FIG. 2 is a diagram illustrating an example of an opto-electronic system that includes a collimating lens to collimate deflected laser beams.
Figure 8A:
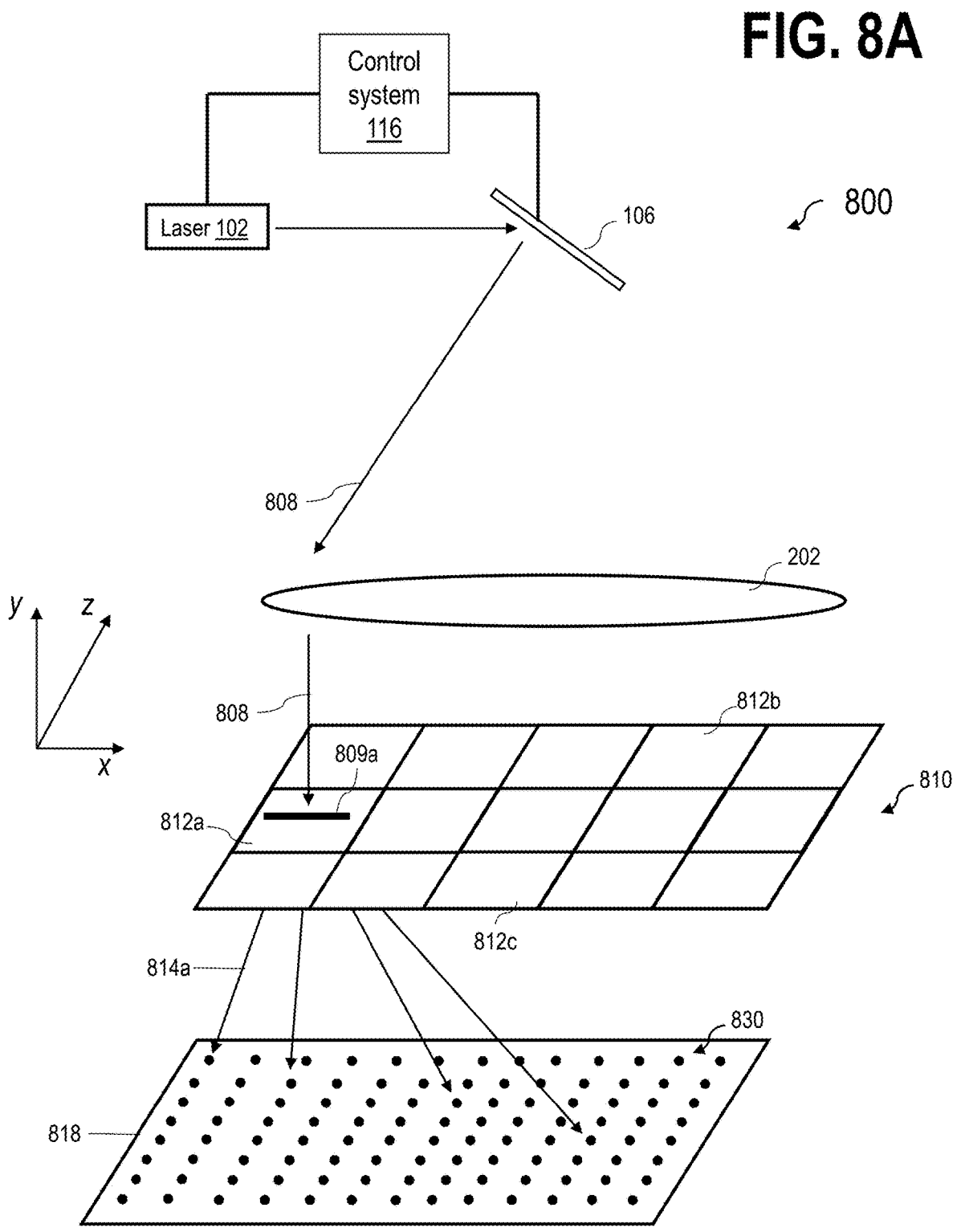
FIGS. 8A-8C are diagrams illustrating examples of configurations of an opto-electronic system including beam deflection along multiple axes to impinge upon a two-dimensional pattern of beam-shaping portions.

In some implementations, because of the collimation provided by the collimating lens 202, the collimated laser beams 204 impinge on the optical element 110 substantially perpendicularly even when emitted across the angular range θ. For example, in some implementations in which beam-shaping portions are arranged in one dimension, such as in a row, the beam-shaping portions can extend in the one dimension orthogonal to a direction in which collimated laser beams are directed. As shown in FIG. 2, beam-shaping portions 112 are arranged in a row extending in direction 230, which is orthogonal to a propagation direction of the collimated laser beams 204. In some implementations in which beam-shaping portions are arranged in a plane, such as in a two-dimensional array, the beam-shaping portions can extend over the plane orthogonal to the direction in which collimated laser beams are directed. As shown in FIG. 8A, beam-shaping portions 812 are arranged in an array in the x-z plane, and impinging laser beams 808 propagate towards the optical element 810 in the −y direction, orthogonal to the x-z plane. The perpendicular impingement feature can simplify design and operation of the opto-electronic system 200 and other systems described in this disclosure, because modification of the collimated laser beams 204 by the optical element 110 is regularized across the angular range θ. Also, in some implementations, in the absence of light deflection caused by the optical element 110, collimation by the collimating lens 202 results in the output light 114 being provided in the same direction regardless of the reflection direction of the beam deflector 106, a characteristic that can be useful for applications of the output light 114.

In various implementations, the collimating lens 202 can be a convex lens, a plano-convex lens, a metasurface lens, a Fresnel lens, or any other suitable optical component configured to collimate light reflected across multiple angles by the beam deflector 106. In some implementations, the collimating lens 202 is a discrete optical component, e.g., a coated or uncoated glass lens. In some implementations, the collimating lens 202 is a printed optical element. For example, the collimating lens 202 can be a printed optical element printed together with one or more beam-shaping portions and integrated into the optical element 110.

Figure 3A:
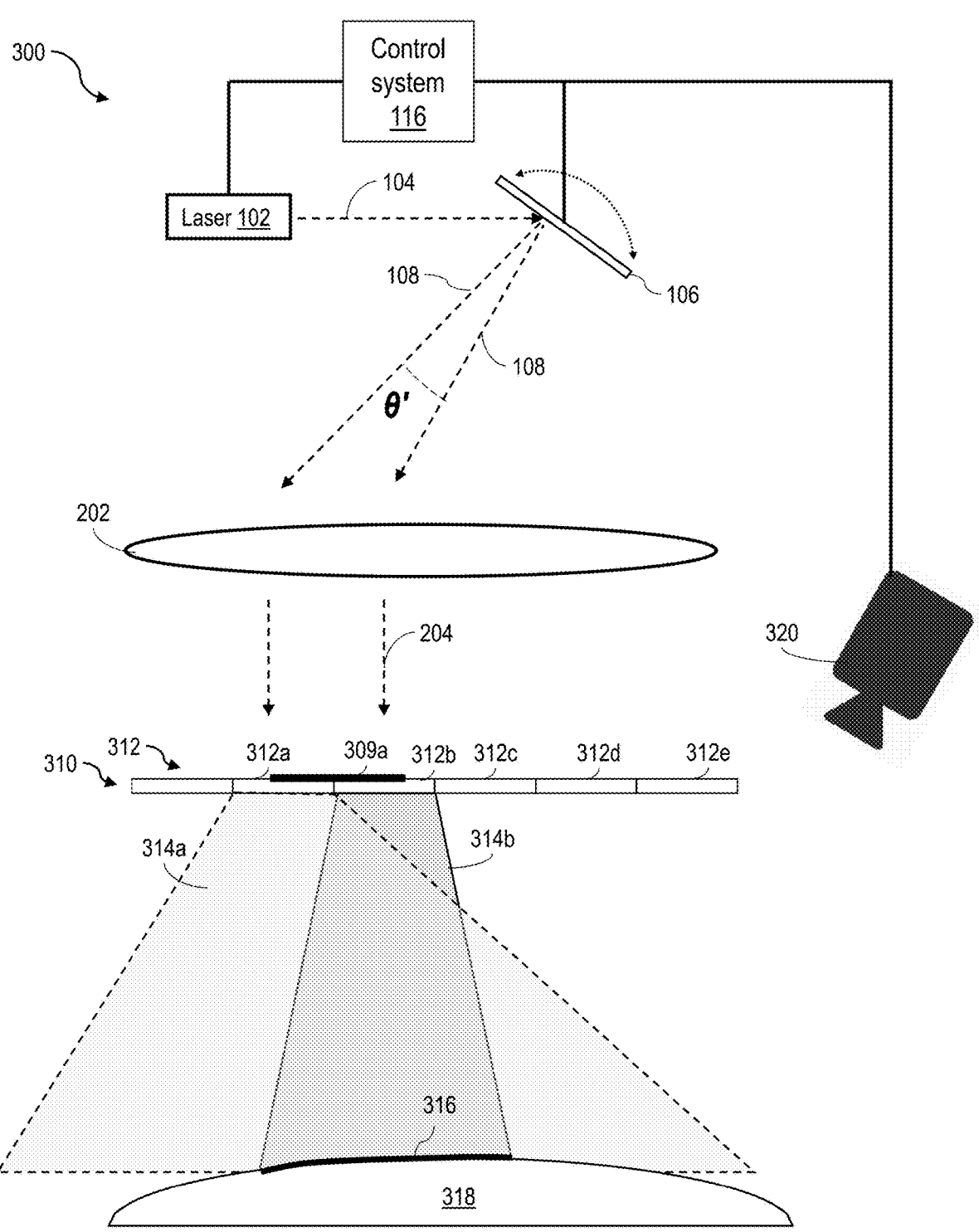
FIGS. 3A-3B are diagrams illustrating examples of configurations of an opto-electronic system to provide superimposed light patterns for imaging.
Figure 3B:
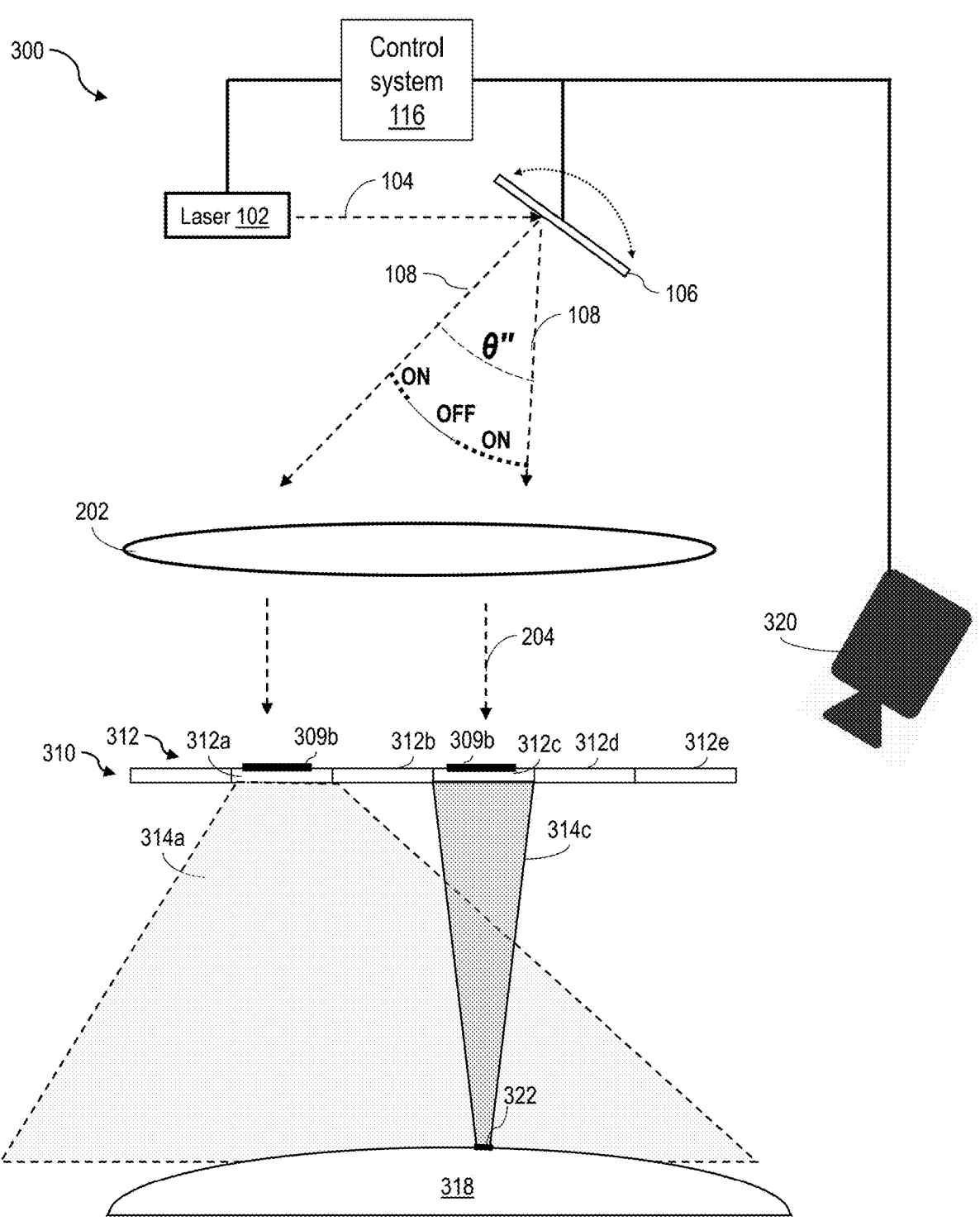

FIGS. 3A-3B illustrate examples of modes of operation of an opto-electronic system 300, the components of which can have characteristics as described for corresponding components of opto-electronic systems 100 and 200, except where indicated otherwise. As shown in FIG. 3A, an optical element 310 includes several beam-shaping portions 312. In this example, beam-shaping portion 312*a* is an optical diffuser configured to modify laser beams to produce substantially diffuse output illumination 314*a* over a solid angle, and beam-shaping portions 312*b*-312*e* are respective fan-shaped beam generators configured to modify laser beams to produce fan-shaped beams that result in one or more illumination lines being formed on target objects. For example, a laser beam passing through beam-shaping portion 312*b* is transformed into a fan-shaped beam 314*b* that forms an illumination line 316 on a surface of an object 318. An image of the object 318 including the illumination line 316, can be captured by a camera sensor 320 of the opto-electronic system 300. The image can then be analyzed (e.g., by the control system 116 and/or by another computing system) to obtain a depth profile or other digital image of the object 318, e.g., by a triangulation process. As a non-limiting example, illumination lines in some implementations have lengths of approximately one meter or less, depending on a distance between the opto-electronic system 300 and the object 318. The opto-electronic system 300 can be included in a displacement sensor having electronics configured to determine a distance between the object 318 and the displacement sensor based on a shape and/or length of the illumination line(s) 316 and/or 322 as captured in an image by a camera sensor of the displacement sensor. The opto-electronic system 300 can be included in a 2D and/or 3D profilometer having electronics configured to determine a surface profile of the object 318 based on a shape and/or length of the illumination line(s) 316 and/or 322 as captured in an image by a camera sensor of the profilometer.

In the context of diffusing beam-shaping portions, fan-shaped beam generating beam-shaping portions, and other types of beam-shaping portions configured to output light having a pattern or shape (e.g., dot array generators and other types of structured light generators), interference of random phase and amplitude variations of coherent light can result in "speckle" in the pattern, leading to inaccuracies in subsequent analyses such as object surface reconstruction. However, in some implementations of systems in which a laser beam is swept over a fan-shaped beam generator, such as the opto-electronic system 300, speckle can be reduced, because speckle in the pattern varies quickly compared to an exposure time of the camera sensor 320, such that the speckle averages out over the course of the exposure. For example, in some implementations the beam deflector 106 and the camera sensor 320 are configured such that, over a single exposure by the camera sensor 320, the collimated laser beam 204 (or reflected laser beam 108 in the absence of the collimating lens 202) is swept over at least half the beam-shaping portion 312*b* or over at least the entirety of the beam-shaping portion 312*b*. The averaging out of direct and indirect interferences can also allow for higher projected laser light intensities without violation of eye safety guidelines that limit light intensity incident on the retina. Further description of swept laser beams and fan-shaped beam generators for illumination line projection can be found in U.S. Patent Application Publication Nos. 2019/0227336 and 2021/0132403, each of which is incorporated herein by reference in its entirety.

In some implementations, an optical diffuser beam-shaping portion of an optical element, such as optical diffuser 312$a$, is a microstructured surface diffuser, such as a diffusing random cylinder array, a pseudo-random engineered cylinder array, or a holographic diffuser. A fan-shaped beam generator beam-shaping portion of an optical element, such as fan-shaped beam generator 312$b$, can itself be a linear diffuser (e.g., a linear diffusing random cylinder array or a linear holographic diffuser). In some implementations, the fan-shaped beam generator beam-shaping portion is a Powell lens or a cylindrical lens. Microstructured optical elements can be formed as printed structures on a substrate, as described in reference to FIG. 4A.

In the opto-electronic system 300, the beam-shaping portions 312$b$-312$e$ have different optical characteristics. For example, the beam-shaping portions 312$b$-312$e$ can be configured to each generate one or more illumination lines having different configurations, such as different numbers of lines (e.g., one line, two lines, three lines, or another number lines); different line densities (e.g., spacing/angle between lines); different line positions (e.g., lines deflected more or less with respect to the beam-shaping portion); different line lengths ("fan angles"); or different focal lengths at which one or more in-focus illumination lines are generated from the beam-shaping portions 312$b$-312$e$. These different optical effects correspond to different optical parameters of the beam-shaping portions 312$b$-312$e$ and can be provided by appropriate design of the beam-shaping portions 312$b$-312$e$. For example, when the beam-shaping portions 312$b$-312$e$ include linear cylinder arrays, characteristics of the cylinder array (e.g., values of cylinder radius, numerical aperture, and depth) can be configured to set the respective fan angles of the beam-shaping portions 312$b$-312$e$. As another example, when each of the beam-shaping portions 312$b$-312$e$ includes diffractive optical elements (DOE) or computer generated holographic (CGH) optical elements, characteristics of the diffractive or holographic structures can be configured to set the respective line parameters (such as length, position, length, and number of lines) of respective produced illumination lines.

The control system 116 is configured to control the laser 102 and/or the beam deflector 106 to cause impingement on a proper subset of the beam-shaping portions 312 (i.e., onto less than all of the beam-shaping portions 312). The impingement on the proper subset can occur over each sweep cycle of the beam deflector 106, over less than a sweep cycle of the beam deflector 106 (e.g., over half a sweep cycle, such as over the course of the deflected laser beam 108 being swept left-to-right or right-to-left), or over multiple sweep cycles of the beam deflector 106 (e.g., impinging on a first beam-shaping portion during one cycle, and impinging on a second beam-shaping portion during a next successive cycle).

In the configuration of FIG. 3A, the control system 116 controls the beam deflector 106 to sweep over an angular range θ' that results in reflected laser beams 108, collimated by the collimated lens into collimated laser beams 204, impinging on beam-shaping portions 312$a$, 312$b$ but not on other beam-shaping portions. The reflected laser beams 108, by sweeping, impinge on an impingement path 309$a$ extending along the beam-shaping portions 312$a$, 312$b$. For example, in some implementations the beam deflector 106 includes a MEMS mirror supported by torsion bars. While a magnetic field is applied to the mirror, a driving current (representing a control signal, e.g., as applied by the control system 116) is flowed through a coil (e.g., a voice coil) integrated into the mirror. Deflection of the mirror can be controlled by varying the magnitude and time-varying parameters (e.g., frequency) of the driving current. For example, the mirror can be held at a constant angle or caused to cycle over a configurable angular range at a configurable frequency, the angular range and frequency configurable by appropriate adjustment of the driving current. Other beam deflector 106 arrangements, such as electrostatically-controlled deflectors and piezoelectric deflectors, are also within the scope of this disclosure. In the configuration of FIG. 3A, the control system 116 controls a current through the beam deflector 106, causing the beam deflector 106 to sweep back and forth over the angular range θ'. In this example, the laser 102 is kept on throughout the entire cycle of the beam deflector 106.

The combination of the optical elements described herein (e.g., optical elements 110, 310, and 400), fast-sweeping beam deflectors (e.g., beam deflector 106), and appropriately-configured control systems (e.g., control system 116) can be used to generate output light that, over the course of an exposure time of an imaging system (e.g., camera sensor 320), includes contributions from multiple beam-shaping portions. The beam deflector is swept at a speed (frequency) that causes laser beams to impinge on each of the multiple beam-shaping portions at least once during an exposure time of the imaging system. For example, in some implementations, a half-cycle time of the beam deflector (time required for the beam deflector to complete a left-to-right or right-to-left rotation during its oscillation) is less than the exposure time of the imaging system. In some implementations, a full-cycle time of the beam deflector is less than the exposure time of the imaging system. Accordingly, the imaging system captures an image showing an object illuminated with light modified by each of the multiple beam-shaping portions. For example, in the configuration of FIG. 3A, the camera sensor 320 is controlled (e.g., by the control system 116) to capture an image that shows both diffuse illumination 314$a$ generally illuminating the object 318 (resulting from light modification by beam-shaping portion 312$a$), and a more-intense illumination line 316 on the object 318 (resulting from light modification by beam-shaping portion 312$b$); the diffuse illumination 314$a$ and the illumination line 316 are superimposed. This configuration can be used, for example, when it is desired to correlate a topological profile of the object 318, as determined based on the illumination line 316, with visual features of the object 318, as shown on other illuminated portions of the object 318. In general, individual properties can be selected, or superimposed, without affecting other properties, such as the orientation and spatial position of the projected light.

FIG. 3B shows another configuration of the opto-electronic system 300, corresponding to different control signals provided by the control system 116. The control system 116 controls the beam deflector 106 to sweep over an angular range θ" that, were the laser 102 kept on continuously, would result in collimated laser beams impinging on beam-shaping portions 312$a$, 312$b$, and 312$c$. However, the control system 106 also, in synchronicity with sweeping of the beam deflector 106, switches the laser 102 on and off such that the laser is on when emitted laser beams would impinge on beam-shaping portions 312$a$ and 312$c$, and off when emitted laser beams would impinge on beam-shaping portion 312*b*. Accordingly, a discontinuous segment of the optical element 310, along an impingement path 309*b*, is used to modify emitted laser beams. As a result, the object 318 is illuminated with both diffuse illumination 314*a* and output light 314*c*, the latter in the form of a fan-shaped beam that forms another illumination line 322 which is shorter than the illumination line 316. The shorter fan angle of the output light 314*c* compared to output light 314*b* results from the different optical properties of beam-shaping portions 312*b* and 312*c*.

As shown in FIGS. 3A-3B, the impingement paths 309*a*, 309*b* are coordinated with the structure of the beam-shaping portions 312 so as to modify the collimated laser beam 204 in desired ways to obtain output light having desired properties. Movement of the collimated laser beam 204 across the impingement paths 309*a*, 309*b*, which are defined by at least one of movement of the beam deflector 106 or on/off states of the laser 102, causes the output light having the desired properties to be formed based on movement of the collimated laser beam 204.

Various control methods can be used to achieve synchronicity between an on/off switching sequence of the laser 102 and corresponding angular configurations of the beam deflector 106. In some implementations, the control system 116 receives a signal (e.g., a voltage and/or current signal) when the beam deflector 106 reaches an end-point of its sweep cycle. The control system 116 also determines an angular sweeping range of the beam deflector, e.g., based on a stored association between control signals applied by the control system 116 and corresponding angular sweeping ranges. In addition, the control system 116 stores data indicating which deflection angles of the beam deflector 106 correspond to which beam-shaping portions 312 of the optical element 310. Based on the angular sweeping range, based on the determined times corresponding to end-points of the sweeping, and based on the stored data that associates deflection angles with corresponding beam-shaping portions 312, the control system 116 transmits on and/or off signals to the laser 102 to selectively cause laser beam impingement on only a desired subset of the beam-shaping portions 312. Other control schemes are also within the scope of this disclosure.

By contrast, in some cases, spatial alignment of optical components is of lower precision and/or reliability. For example, some alternative optical output schemes can rely on multiple projection modules that have at least partially separate optical systems, such as two or more laser beam emitters. For example, each projection module can be configured to output a particular type of light, or to project light for operation at a particular working distance. The separate optical systems must be spatially aligned with one another, which can be costly, difficult to implement, and unreliable. For example, the optical systems can become misaligned as a device including the systems is moved and used. By contrast, some implementations of the systems described in this disclosure use a single laser beam emitter to obtain highly configurable and variable light output, avoiding some of the challenges associated with spatial alignment of multiple laser beam emitters and/or other components of multiple projection modules.

In some implementations, instead of or in addition to binary on/off control of the laser 102, the control system 116 and the laser 102 are configured so that an emission power (light intensity) of the laser 102 is adjusted in synchronicity with sweeping of the beam deflector 106. For example, the control system 116 can control the laser 102 to set a first non-zero light intensity when the laser 102 is emitting laser beams that will impinge on a first beam-shaping portion, and to set a second, different non-zero light intensity when the laser 102 is emitting laser beams that will impinge on a second beam-shaping portion. For example, in reference to FIG. 3B, the control system 1116 can control the laser 102 to have a first emission power when emitting laser beams that will impinge on beam-shaping portion 312*a*, and to have a second, different emission power when emitting laser beams that will impinge on beam-shaping portion 312*b*.

In some implementations, the control system 116 controls the laser in a pulsed mode, where pulses corresponding to laser beam emission are synchronized with sweeping of the beam deflector 106 to impinge on one or more target beam shaping portions 112.

By appropriate combinations of control of the beam deflector 106 to control reflection angular ranges and/or control of the laser 102 to control when the laser is on or off, near-arbitrary combinations of beam-shaping portions can be impinged with laser beams, to obtain various combinations of one or more types of output light. This can include switching between single configurations (where only one of the beam-shaping portions is used) to various overlay configurations (where two or more of the beam-shaping portions are used together). In some implementations, the control system 116 causes the laser 102 to switch on and off at different times during different sweep cycles of the beam deflector 106, the different sweep cycles together forming a meta-cycle. For example, during a first sweep cycle the laser 102 can be switched on for impingement on a first beam-shaping portion but not a second beam-shaping portion, and during a second sweep cycle the laser 102 can be switched on for impingement on the second beam-shaping portion but not on the first beam-shaping portion. The first sweep cycle and the second sweep cycle can alternate with one another to make up a meta-cycle that repeats every two sweep cycles of the beam deflector 106. This can result in an identical illumination pattern to that produced if the first and second beam-shaping portions were impinged on during each sweep cycle, but with a lower intensity of the illumination as averaged over multiple sweep cycles (e.g., as averaged over an exposure time of the camera sensor 320).

As another example, to reproduce a similar light output to that shown in FIG. 3A, instead of reducing the angular sweep range to θ', the control system 116 can instead cause the beam deflector 106 to sweep over a larger range (e.g., over beam-shaping portions besides 312*a* and 312*b*, in addition to beam-shaping portions 312*a* and 312*b*), and can also cause the laser 102 to switch on and off such that only beam-shaping portions 312*a* and 312*b* are impinged on.

In some implementations, the control system 116 is configured to control a sweep speed of the beam deflector 106 so as to sweep the laser beam over different beam-shaping portions at different speeds. This can result in different aggregate light intensities from different beam-shaping portions over the course of an exposure time of a camera sensor. For example, in reference to the configuration of FIG. 3B, the control system 116 can be configured to sweep the collimated laser beam 204 over the impingement path 309*b* at a first speed when impinging on beam-shaping portion 312*a* and at a second, different speed (e.g., a faster speed) when impinging on beam-shaping portion 312*b*, where both beam-shaping portions 312*a* and 312*b* are impinged on within an exposure time of the camera sensor 320. Because beam-shaping portion 312*a* is impinged on for a longer time than beam-shaping portion 312*b* during the exposure time of the camera sensor 320, output light 314*a* has a higher average spatially-aggregated intensity than output light 314b. The beam deflector 106 can be configured to sweep the laser beam at different speeds over adjacent beam-shaping portions, non-adjacent beam-shaping portions, or both. In some implementations, the control system 116 controls the sweep speed by controlling a time-dependent signal frequency (e.g., current signal frequency and/or voltage signal frequency) of control signals provided by the control system 116 to the beam deflector 106.

By use of a swept beam deflector in conjunction with beam deflector control and/or laser beam control, various customizable types of optical output can be obtained by electrical, timing-based means. Dynamic control of the beam deflector and/or laser can be carried out with high temporal precision, e.g., with a precision of less than 50 ns or less than 100 ns, and similar or better precision can be achieved in determining beam deflector state as a function of time, e.g., based on received signals corresponding to endpoints of the sweep cycle. Accordingly, close timing alignment can be achieved between electrical control signals and beam deflector/laser state, so as to precisely target particular beam-shaping portions for laser beam impingement. The beam deflector and/or laser can be controlled "dynamically" in that angular positions of the beam deflector in one or more dimensions, sweep speed of the beam deflector, on/off state of the laser, and/or emission power of the laser can be controlled during sweep cycles of the beam deflector and/or between sweep cycles of the beam deflector in order to, by controlled movement of defined laser beam impingement paths on an optical element, project output light having one or more desired optical properties.

Although the examples of FIGS. 3A-3B show two beam-shaping portions impinged on, in various implementations one, three, or more beam-shaping portions can be impinged upon, based on appropriate control by the control system 116. The impinged-on beam-shaping portions can be continuous with one another/adjacent to one another on the optical element 110 (e.g., such as beam-shaping portions 312a and 312b), and/or can be discontinuous with one another/not adjacent to one another (e.g., such as beam-shaping portions 312a and 312c).

Figure 4B:
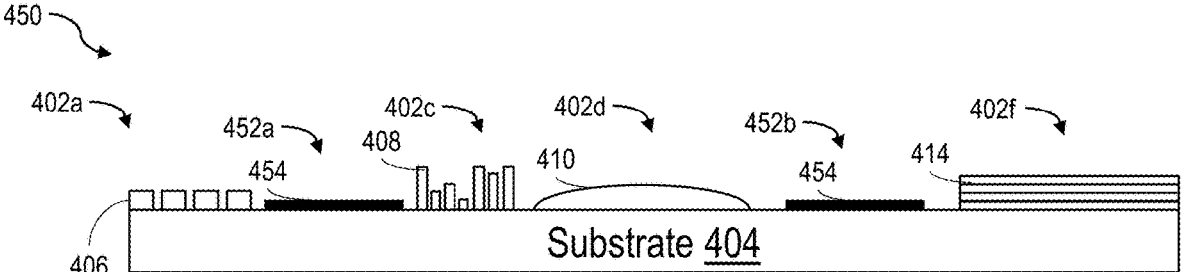

In some implementations, an optical element includes one or more beam-blocking elements arranged between beam-shaping portions. For example, as shown in FIG. 4B, an optical element 450 includes a first beam-blocking element 452a between beam-shaping portions 402a and 402c, and a second beam-blocking element 452b between beam-shaping portions 402d and 402f. The beam-blocking elements 452a and 452b include respective films 454 that are opaque to at least some laser light impinging on the optical element 452. Beam-blocking elements such as beam-blocking elements 452a and 452b can prevent laser beams from transmitting through the substrate 404 when impingement paths are arranged between beam-shaping portions.

Figure 5:
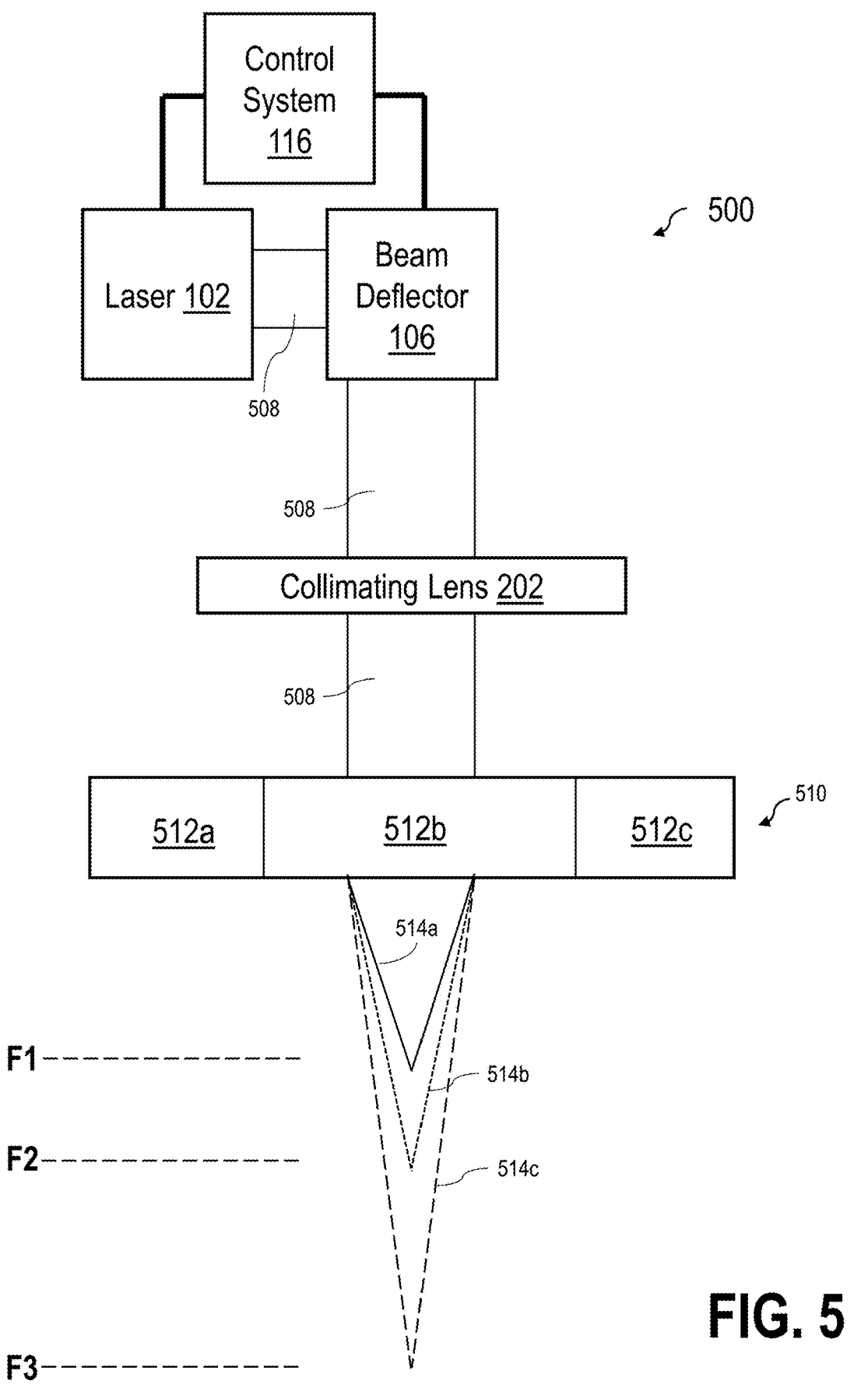
FIGS. 5-7 are diagrams illustrating examples of opto-electronic systems having optical elements that can modify light in different ways.
Figure 6:
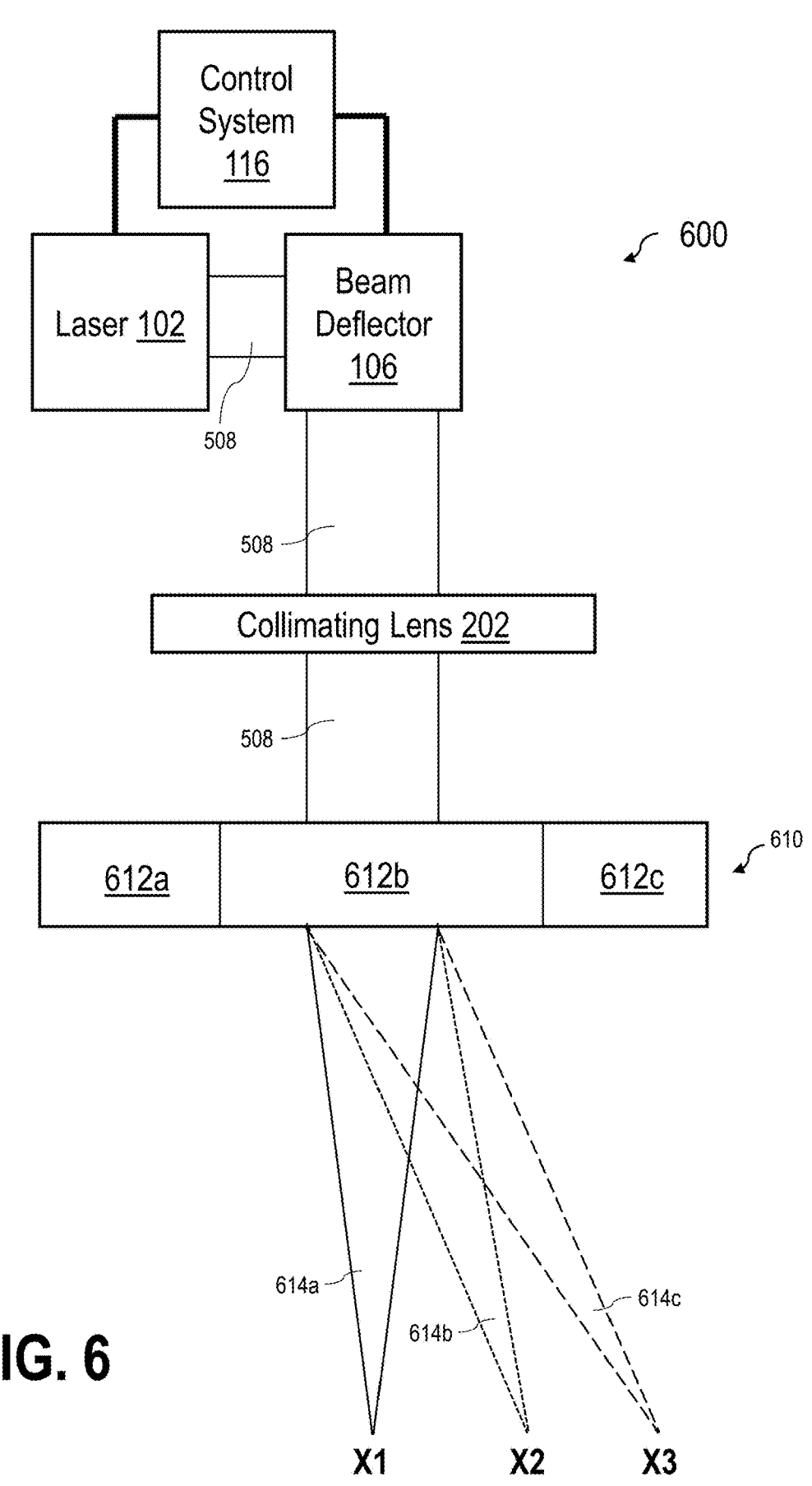
Figure 7:
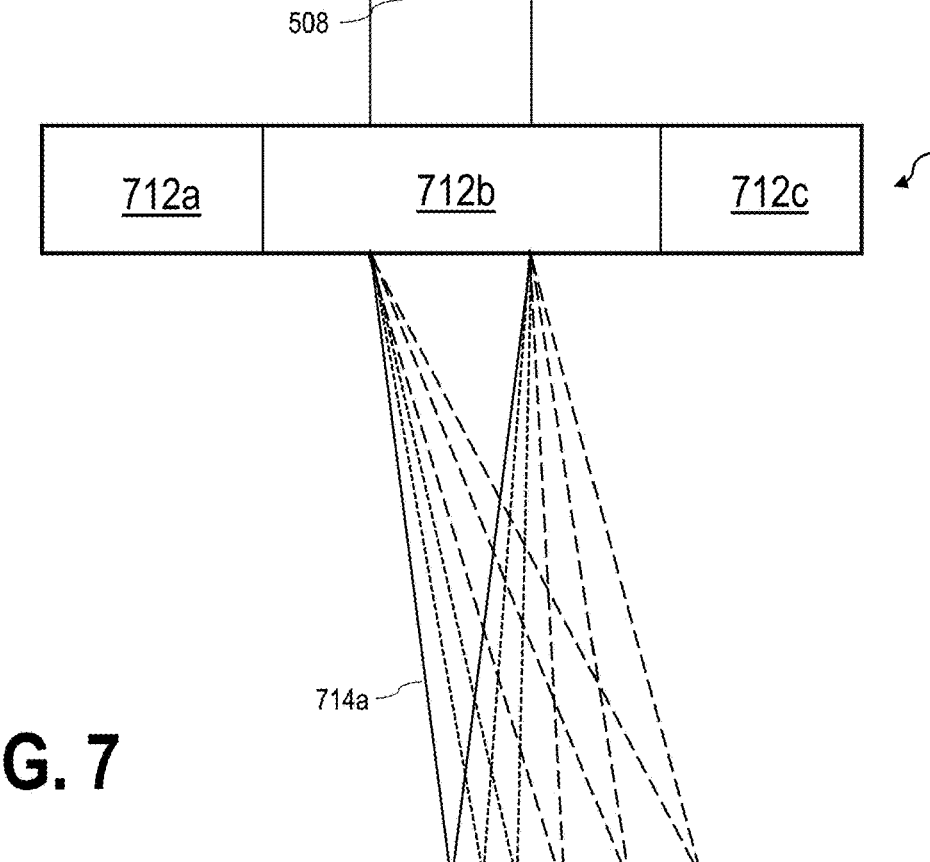

FIGS. 5-7 illustrate opto-electronic systems 500, 600, and 700 having different optical elements that can modify light in different ways. For clarity, in FIGS. 5-7, laser beams 508 are shown following a single set path through the opto-electronic systems 500, 600, and 700 to impinge upon respective optical elements 510, 610, 710. In practice, the precise path followed by laser beams would depend upon the angular configuration of the beam deflector 106, which changes as the beam deflector 106 sweeps, and the laser beams 508 would impinge on different beam-shaping portions to produce output light having different characteristics. Camera sensors are not shown but can be included in each opto-electronic system 500, 600, and 700 as described above. Except where indicated otherwise, components of the opto-electronic systems 500, 600, and 700 can have characteristics as described for corresponding components of other opto-electronic systems described herein, such as opto-electronic systems 100, 200, and 300.

As shown in FIG. 5, an optical element 510 includes three beam-shaping portions 512a, 512b, and 512c. The three beam-shaping portions 512a, 512b, and 512c are configured to modify the laser beams 508 to project output light (e.g., fan-shaped beams for illumination lines, patterned illumination for dot arrays or stripes, or other forms of light) at different respective focal distances. Specifically, the first beam-shaping portion 512a is configured to provide output light 514a focused at a first distance F1 to a first focal plane; the second beam-shaping portion 512b is configured to provide output light 514b focused at a second distance F2 to a second focal plane; and the third beam-shaping portion 512c is configured to provide output light 514c focused at a third distance F3 to a third focal plane. The control system 116 is configured to control the beam deflector 106, the laser 102, or both, to output any combination of output light 514a, 514b, and/or 514c. For example, the control system 116 can receive a signal indicating a need for output light focused at distance F2 and, in response, adjust on/off times of the laser 102 and/or adjust a swept angular range of the beam deflector 106 to cause only the second beam-shaping portion 512b to be impinged on with the laser beams 508.

As shown in FIG. 6, an optical element 610 includes three beam-shaping portions 612a, 612b, and 612c. The three beam-shaping portions 612a, 612b, 612c are configured to modify the laser beams 508 to project output light at different tilt angles, e.g., towards different positions. Specifically, the first beam-shaping portion 612a is configured to provide output light 614a towards a first position X1; the second beam-shaping portion 612b is configured to provide output light 614b towards a second position X2; and the third beam-shaping portion 612c is configured to provide output light 614c towards a third position X3. The control system 116 is configured to control the beam deflector 106, the laser 102, or both, to output any combination of output light 614a, 614b, and/or 614c. For example, the control system 116 can receive a signal indicating a need for illumination lines at positions X1 and X3 and, in response, adjust on/off times of the laser 102 and/or adjust a swept angular range of the beam deflector 106 to cause only the first and third beam-shaping portions 612a and 612c to be impinged on with the laser beams 508. As a result, for example, illumination lines can be formed at different parallel positions within a field of view of a camera sensor.

As shown in FIG. 7, an optical element 710 includes three beam-shaping portions 712a, 712b, 712c. The three beam-shaping portions are configured to modify the laser beams 508 to project output light that results in different combinations of illumination lines. Specifically, the first beam-shaping portion 712a is configured to provide output light 714a that forms a single illumination line; the second beam-shaping portion 712b is configured to provide output light 714b that forms two illumination lines; and the third beam-shaping portion 712c is configured to provide output light 714c that forms three illumination lines. A spacing between illumination lines from output light 714b and 714c can be the same or different, in various implementations. The control system 116 is configured to control the beam deflector 106, the laser 102, or both, to output any combination of output light 714a, 714b, and/or 714c. For example, the control system 116 can receive a signal indicating a need for three illumination lines and, in response, adjust on/off times of the laser 102 and/or adjust a swept angular range of the beam deflector 106 to cause only the third beam-shaping portion 712c to be impinged on with the laser beams 508. Note that, for clarity of viewing, output light 714a, 714b, and 714c are shown as spatially displaced from one another, but in general the output light 714a, 714b, 714c can be directed at a same position and need not form spatially-displaced illumination lines.

As noted above, in some implementations beam deflectors are controlled to vary beam deflection in two dimensions. This two-dimensional control can be (though need not be) combined with optical elements having beam-shaping portions arranged in two dimensions. For example, as shown in FIG. 8A, an opto-electronic system 800 includes a laser 102, a beam deflector 106, a collimating lens 202, and a control system 116, as described above; a camera sensor can optionally be included. The control system 116 is configured to control the beam deflector 106 in two dimensions (along two axes). For example, the control system 116 can be configured to cause the beam deflector 106 to sweep back and forth over a solid angle, and/or to sweep in one dimension from a reference point controllable in a second dimension. Control of angular orientation over multiple axes can be performed using multiple control signals, e.g., a first control current corresponding to a first axis and a second control current corresponding to a second axis orthogonal to the first direction.

An optical element 810 includes beam-shaping portions, such as beam-shaping portions 812a, 812b, and 812c (collectively referred to as beam-shaping portions 812), arranged in two dimensions to form an overall array. The optical element 810 is arranged and configured so that impinging laser beams 808 impinge on the optical element 810 perpendicularly for different angular configurations of the beam deflector 106 over a solid angle controllable in two axes. The different beam-shaping portions 812 have different optical properties from one another so as to differently modify impinging laser beams 808. As described above, the different optical properties can result in various different optical properties of output light, such as different output light projection directions, different output light patterns, different output light polarizations, different output light focal distances, different intensities, and/or other optical properties, with reduced speckle due to the constant sweeping of the impinging laser beams 808.

In the configuration of FIG. 8A, the control system 116 controls the beam deflector 106 and/or the laser 102 to sweep the laser beam 808 back and forth as an impingement path 809a localized on beam-shaping portion 812a. The beam-shaping portion 812a is configured to modify the laser beam 808 to produce output light 814a that forms a two-dimensional dot pattern (dot array) 830 on an object 818. For example, the beam-shaping portion 812a can include a microlens array. The dots of the two-dimensional dot pattern 830 have relatively uniform intensities when imaged by a camera sensor because of the sweeping of the beam over the impingement path 809a.

Figure 8B:
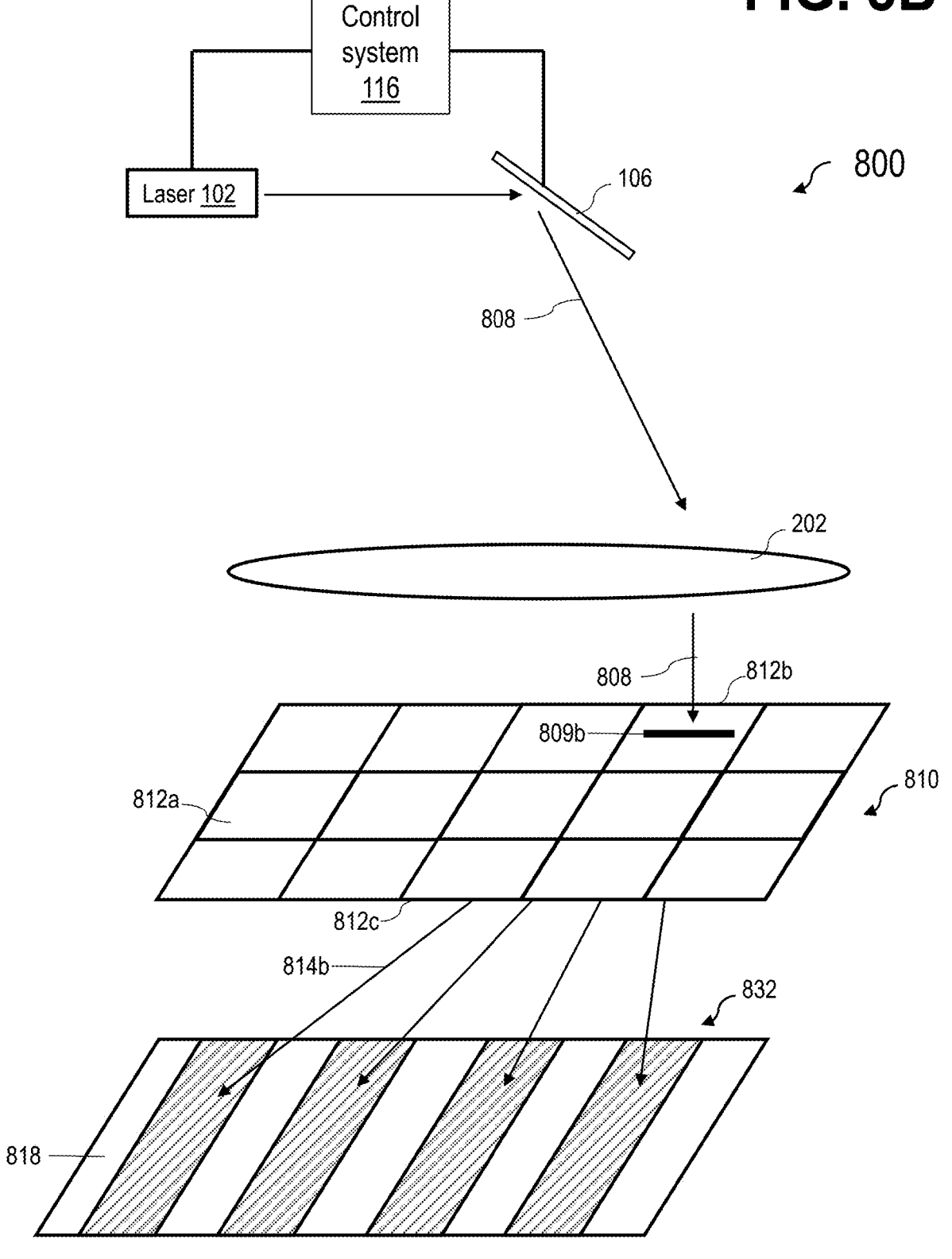

In the configuration of FIG. 8B, the control system 116 controls the beam deflector 106 and/or the laser 102 to sweep the laser beam 808 back and forth as an impingement path 809b localized on beam-shaping portion 812b. The beam-shaping portion 812b is configured to modify the laser beam 808 to produce output light 814b that forms a stripe pattern 832 (e.g., a Gray code pattern) on the object 818. For example, the beam-shaping portion 812b can include a holographic or diffractive optical element, such as a computationally-derived optical element that is computationally determined to produce the stripe pattern 832. The stripes of the stripe pattern 832 have relatively uniform intensities when imaged by a camera sensor because of the sweeping of the beam over the impingement path 809b. Moreover, because of speckling reduction caused by the sweeping, eye safety is improved for users who may look at the output light 814b.

Figure 8C:
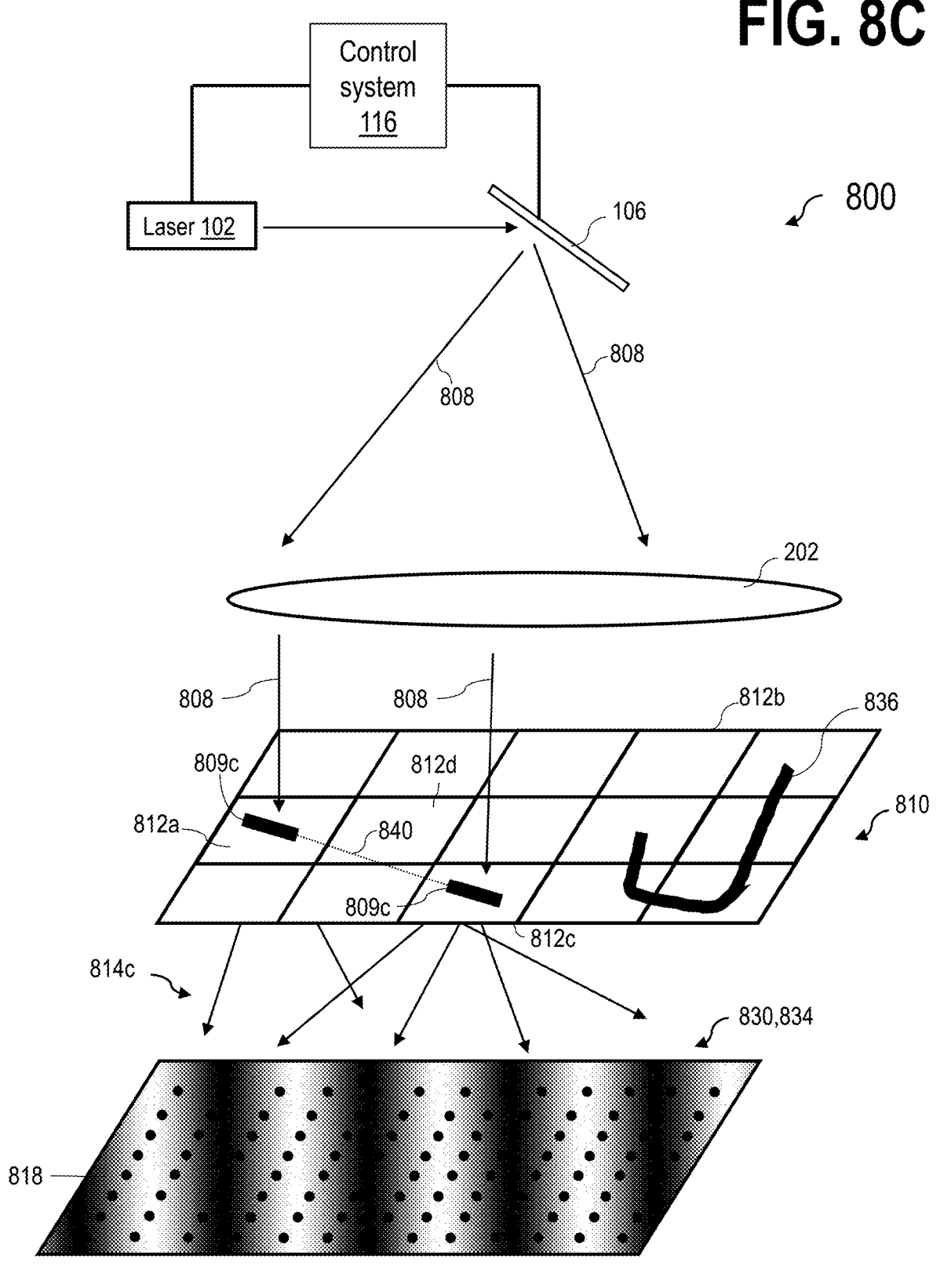

In the configuration of FIG. 8C, the control system 116 controls the beam deflector 106 to sweep back and forth so as to aim the laser beam 808 at beam-shaping portions 812a and 812c, and at beam-shaping portion 812d arranged between beam-shaping portions 812a and 812d, along a path indicated by dotted line 840 and lines 809c. However, the control system 116 also controls the laser 102 in synchronicity with sweeping of the beam deflector 106, to switch the laser 102 off when emitted laser beams would impinge on the dotted line 840 and to switch the laser 102 on when emitted laser beams would impinge on the lines 809c, which represent the impingement path of this configuration. Accordingly, based on coordination of laser control and beam deflector control, the laser beams 808 impinge on the impingement path 809c on beam-shaping portions 812a and 812c but not on beam-shaping portion 812d. Beam-shaping portion 812c is configured to modify to modify the laser beam to produce output light that forms a phase-shift pattern 834 on the object 818. Accordingly, when a sweep speed of the beam deflector 106 is such that the impingement path 809c is swept over in less than an exposure time of an imaging camera sensor (not shown), the camera sensor will image a superposition of the two-dimensional dot pattern 830 and the phase-shift pattern 834 on the object 818.

In some implementations, a beam deflector is controlled such that an impingement path is two-dimensional. For example, as shown in FIG. 8C, impingement path 836 extends in two dimensions, corresponding to impingement on five underlying beam-shaping portions. Two-dimensional impingement paths can be open-looped with the laser beam retracing its path back and forth each cycle (e.g., as shown for impingement path 836), or can be closed-loop such that the laser beam moves along the impingement path in a continuous loop without having to backtrack along the impingement path.

Figure 9A:
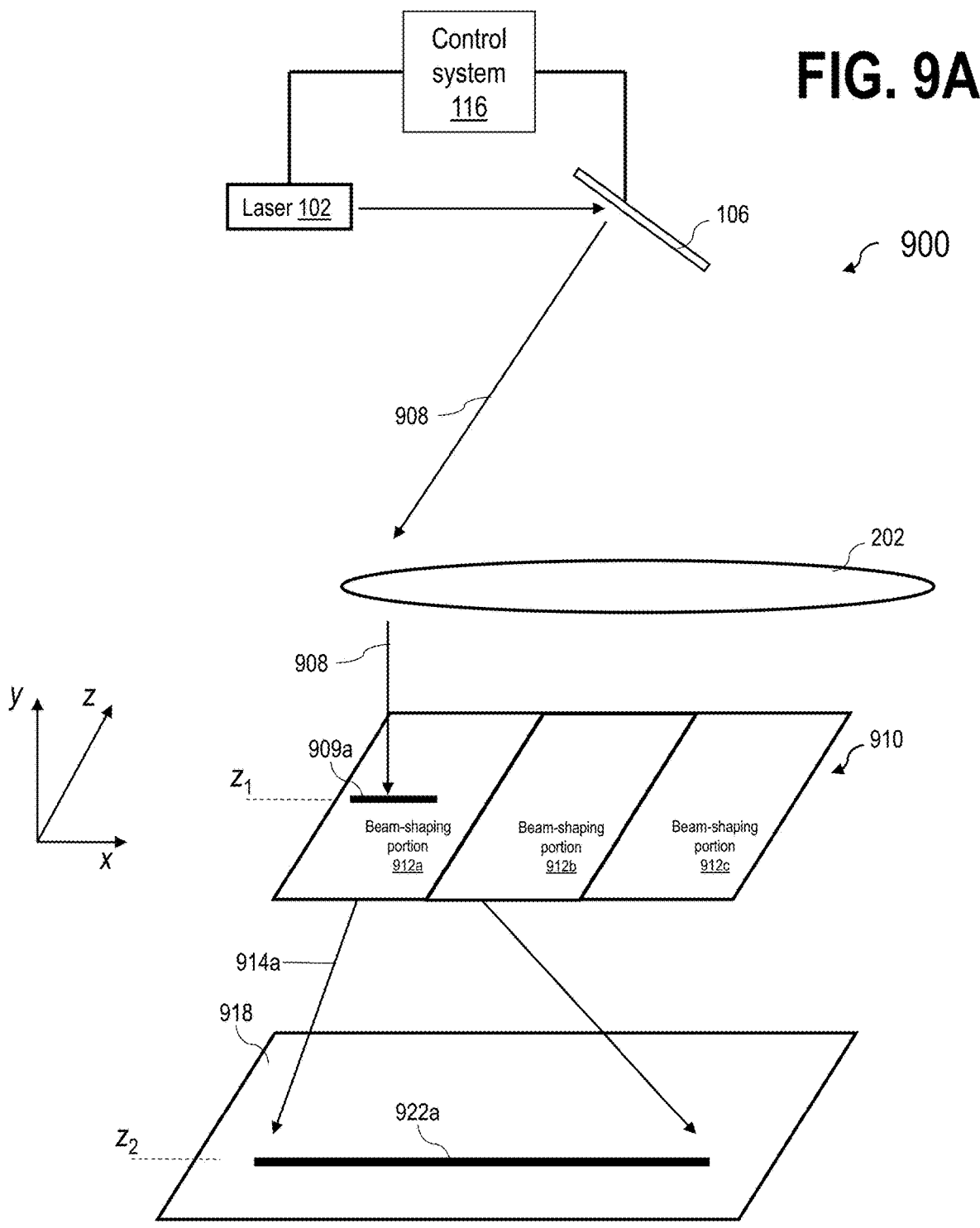
FIGS. 9A-9B are diagrams illustrating examples of configurations of an opto-electronic system including beam deflection along multiple axes to translate a projected light pattern.

In some implementations, laser beam impingement is controlled in a second dimension over one or more beam-shaping portions to translate/reposition a resulting optical pattern. For example, as shown in FIG. 9A, an opto-electronic system 900 includes beam-shaping portions 912a, 912b, and 912c arranged linearly (in a one-dimensional array). The control system 116 controls the beam deflector 106 and/or the laser 102 to sweep a laser beam 908 back and forth as an impingement path 909a on beam-shaping portion 912a along an x-axis at a first z coordinate $z_1$. The beam-shaping portion 912a modifies the laser beam 808 to produce output light 914a that forms an illumination line 922a on an object 918. The illumination line 922a is formed at a second z coordinate $z_2$. The illumination line 922a has reduced speckle when imaged by a camera sensor because of the sweeping of the beam over the impingement path 909a.

Figure 9B:
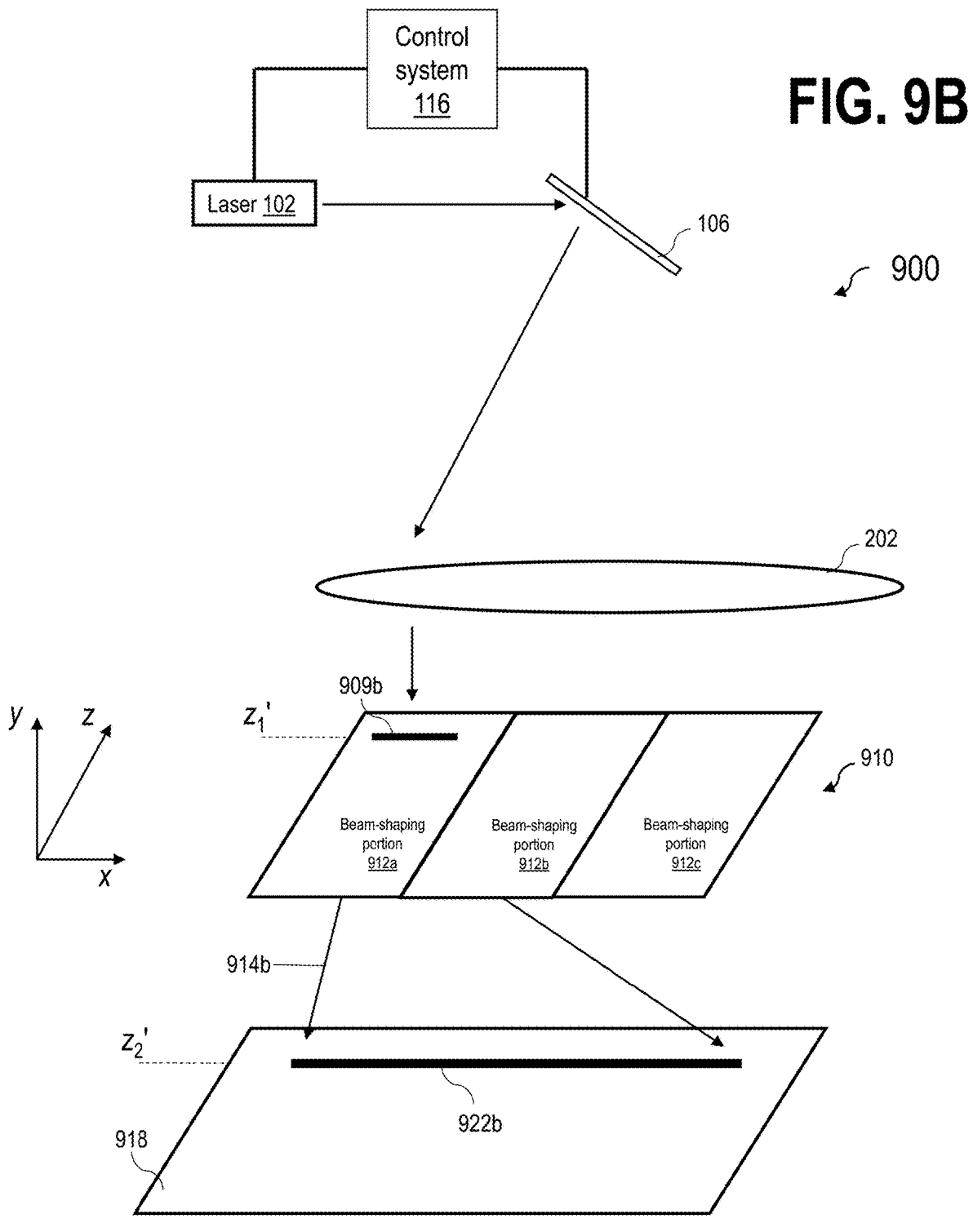

In the configuration of FIG. 9B, the control system 116 controls the beam deflector 106 and/or the laser 102 to sweep the laser beam 808 back and forth as an impingement path 909b on beam-shaping portion 912a along the x-axis at a z coordinate $z_1'$, which is different from $z_1$. The beam-shaping portion 912a modifies the laser beam 808 to produce output light 914b that forms an illumination line 922b on the object 918 at z coordinate $z_2'$, which is different from $z_2$. Translation of the impingement path 909b compared to impingement path 909*a* has correspondingly translated illumination line 922*b* compared to illumination line 922*a*, e.g., in the same direction.

Figure 10:
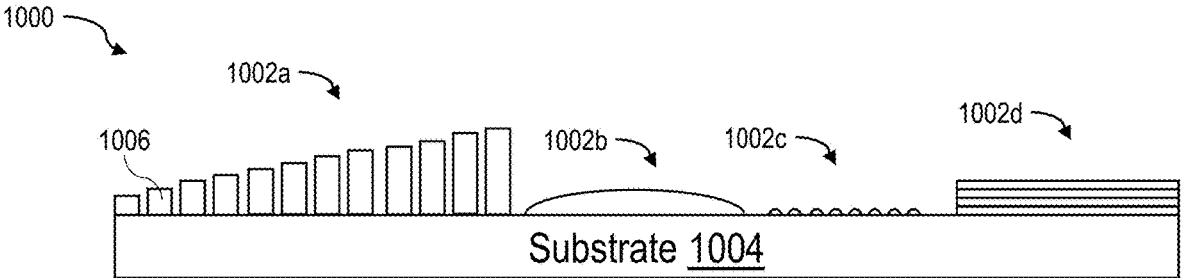
FIG. 10 is a side-view diagram illustrating an example of an optical element.

Some optical elements according to this disclosure have one or more optical properties that vary continuously instead of, or in addition to, optical properties that result in discrete, separate beam-shaping portions. For example, as shown in FIG. 10, an optical element 1000 includes a substrate 1004, a first section 1002*a*, and three beam-shaping portions 1002*b*, 1002*c*, and 1002*d*. The first section 1002*a* includes microstructures 1006 having heights that vary along the length of the first section 1002*a*. Accordingly, a laser beam impinging at different points along the first section 1002*a* will be modified differently to produce output light having different optical characteristics, such that the first section 1002*a* can be described as itself including multiple beam-shaping portions. As other examples, continuously-varying optical properties can include continuously varying spacings of microstructures, continuously-varying material properties (e.g., refractive index), and/or other optical properties. In some implementations, an optical element does not include discrete beam-shaping portions 1002*b*, 1002*c*, and 1002*d* but, rather, includes only a continuously-varying section such as the first section 1002*a*.

Figure 11:
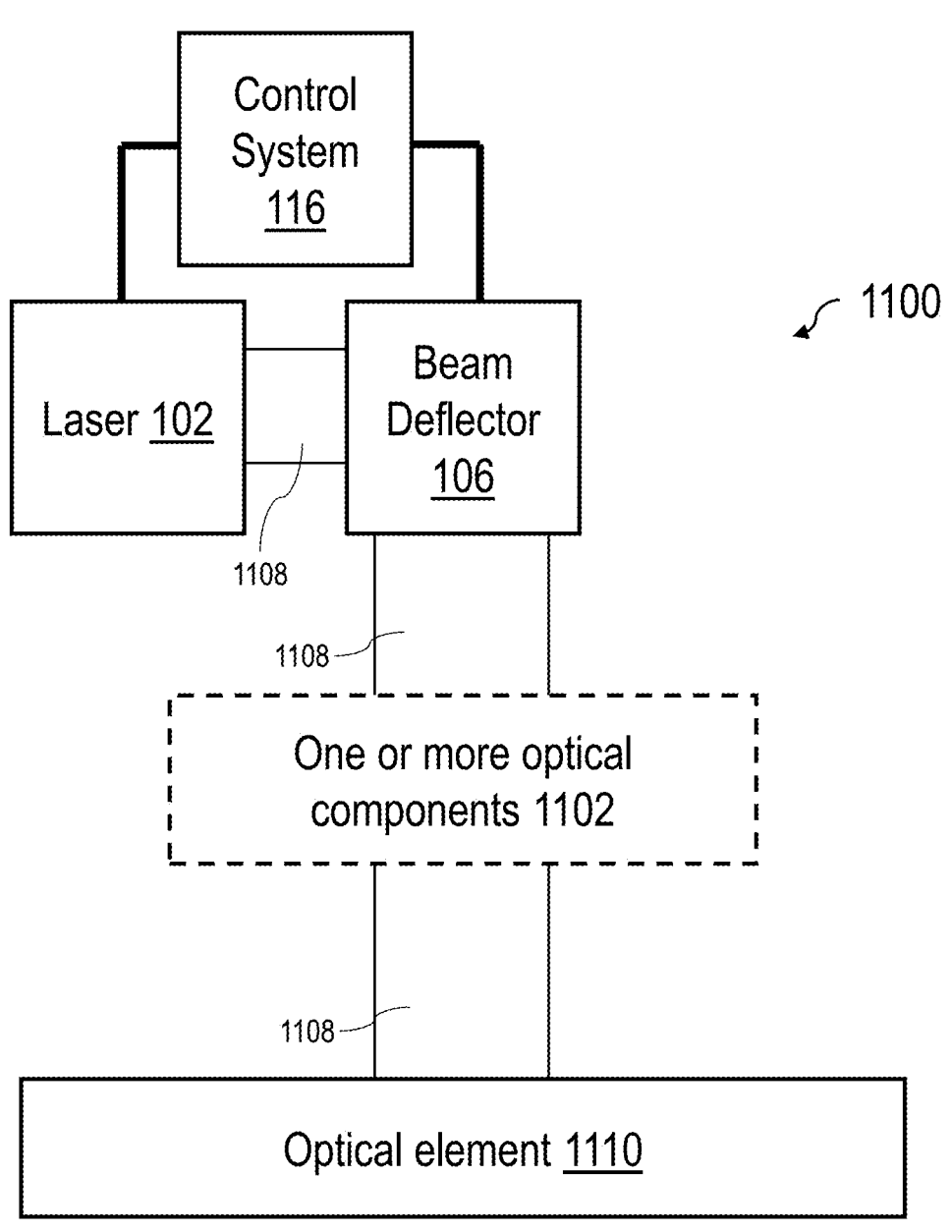
FIG. 11 is a diagram illustrating an example of an opto-electronic system having one or more optical components.

Some opto-electronic systems according to this disclosure include one or more optical components instead of, or in addition to, a collimating lens. As shown in FIG. 11, an opto-electronic system 1100 includes a laser 102, a control system 116, a beam deflector 106, and an optical element 1110 having a plurality of beam-shaping portions, e.g., as described above for corresponding components in FIGS. 1-10. One or more optical components 1102 are arranged between the beam deflector 106 and the optical element 1110 so as to interact with laser beams 1108 reflected by the beam deflector 106 and transmitted towards the optical element 1110. The one or more optical components 1102 are configured to adjust one or more optical parameters of the laser beams 1108, such that laser beams 1108 having the one or more adjusted optical parameters impinge on the optical element 1110. The one or more optical components 1102 can include a collimating lens, such as collimating lens 202, which collimates the laser beams 1108 to be substantially parallel over different reflection angles of the beam deflector 106, e.g., so as to impinge perpendicularly on the optical element 1110. The one or more optical components 1102 can instead or additionally include one or more other types of optical component. For example, the one or more optical components 1102 can include one or more lenses instead of or in addition to a collimating lens. The lenses can include a cylindrical lens configured to focus the laser beams 1108 into lines; acylindrical lenses configured to focus the laser beams 1108 into lines with reduced aberration; and/or other lens types. For example, when the laser beams 1108 are swept in one dimension along a cylindrical lens, the laser beams 1108 can be collimated along a first axis while having their beam properties unchanged along a second axis. The one or more optical components 1102 can include one or more diffusers, such as a linear diffuser. For example the diffusers can include a linear diffusing random cylinder array, a linear holographic diffuser, and/or a Powell lens. The one or more optical components 1102 can include one or more DOEs, such as a diffractive beam-splitter, such as for structured light generation; a diffractive diffuser; and/or a diffractive beam-shaper. The one or more optical components 1102 can include one or more apertures, e.g., configured to reduce transmission of the laser beams 1108 (e.g., by reducing a spatial cross-section of the laser beams 1108).

The one or more optical components 1102 can include other types of optical component, such as filters, mirrors, polarizers, beamsplitters, waveplates, prisms, and/or another type of optical component configured to perform one or more optical functions such as wavelength and/or polarization control, beam redirection, beam focusing, beam collimation, beam pattern generation (e.g., splitting of an incident laser beam into multiple beams), intensity control, and/or another optical function.

The laser beams 1108 modified by the one or more optical components 1102 impinge on the optical element 1110 as described above and are further modified by beam-shaping portions of the optical element 1110 to produce output light. The one or more optical components 1102 as described here can be integrated into any of the opto-electronic systems described in this disclosure, such as into opto-electronic systems 100, 200, 300, 500, 600, 700, 800, or 900.

It should be understood that the above-described components of the opto-electronic systems such as systems 100, 200, 300, 800, 900, and 1100 (e.g., laser, beam deflector, control system, optical element, optional collimating lens, optional other optical components, and optional camera sensor) can be variously combined into one or more housings/enclosures in a precise and stable interrelationship in a manner that provides a desired form factor and functionality for the desired task. Enclosures can be constructed of any appropriate material including polymers, such as polycarbonate, acrylic, etc. or metals, such as aluminum alloy, steel, magnesium alloy, etc. Distances between components and sizes of components can be based on component limitations (e.g., wording distances) and on the applications in which the opto-electronic systems are to be used, in a manner clear to those of skill in the art. For example, in some implementations, components have sizes between 1 mm and 5 cm, and distances between components are between 1 mm and 5 cm; however, the sizes and components can be smaller or larger than these ranges in some implementations. The components can be mounted or otherwise fixed (e.g., using brackets). so as to maintain appropriate spatial relationships with one another. In some implementations, at least some of the components are integrated into an optical printed circuit board (PCB) and/or electronic PCB. For example, the control system 116 can include one or more integrated circuits mounted on a PCB and coupled, by metal PCB traces, to the beam deflector 106, the laser 102, and/or the camera sensor 320, one or more of which can be mounted on the PCB. Other types of mountings and interconnections, such as wires, are also within the scope of this disclosure.

Figure 12:
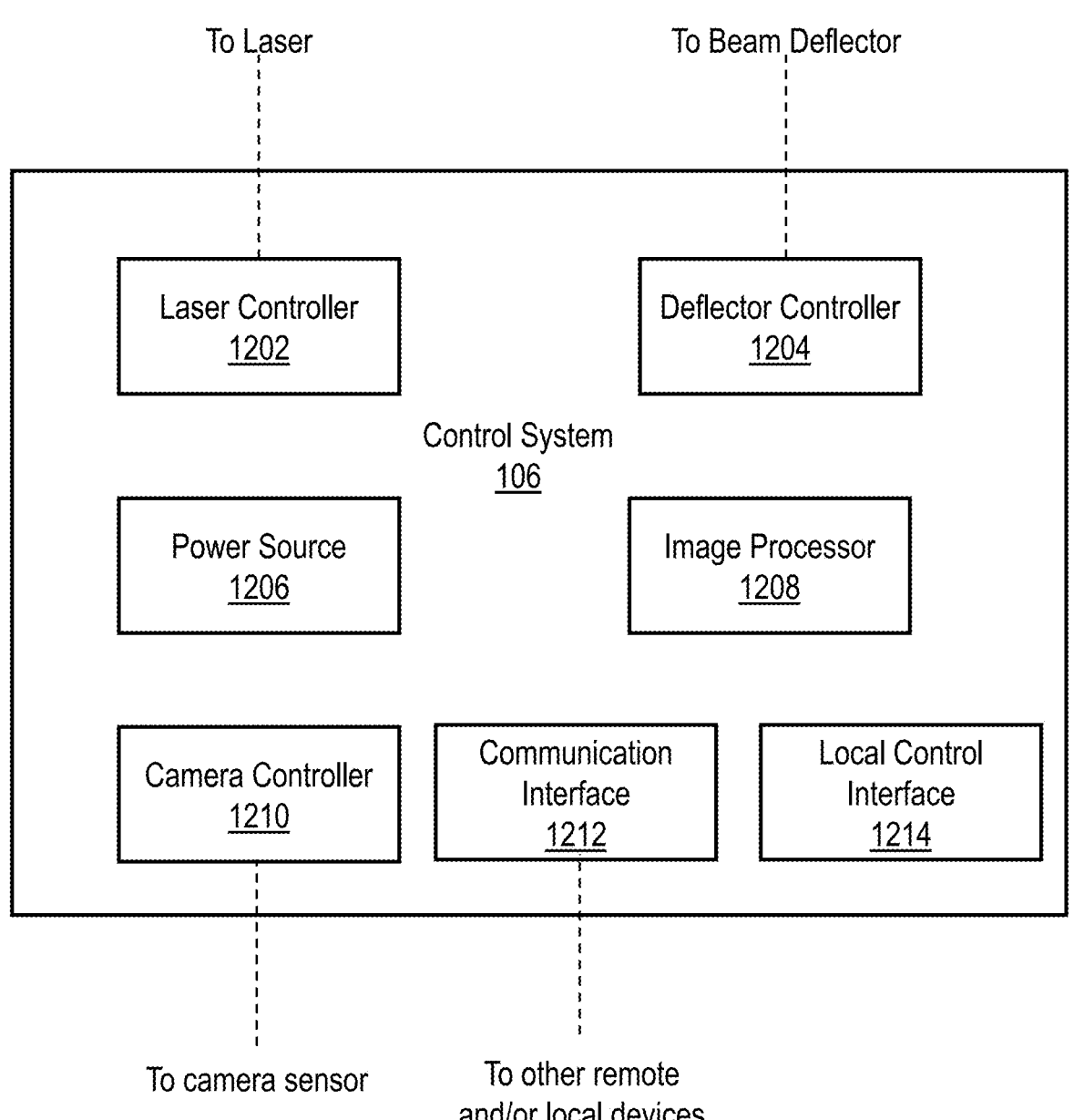
FIG. 12 is a diagram illustrating an example of a control system.

As shown in FIG. 12, in some implementations, a control system 116 includes electronics implementing one or more hardware processors, e.g., central processing units (CPUs), graphic processing units (GPUs), or combinations thereof, which can each include multiple processor cores. The control system 116 includes one or more computer-readable storage media that can include one or both of volatile or non-volatile memory, such as Random Access Memory (RAM) and/or Flash RAM, for instance. The storage medium encodes instructions, that when executed by the data processing apparatus, cause the control system 116 to implement aspects of processes disclosed herein, for instance.

In this example, the control system 116 includes a laser controller 1202, a deflector controller 1204, a power source 1206, an image processor 1208, a camera controller 1210, a communication interface 1212, and a local control interface 1214. The controllers 1202, 1204, and 1210, the image processor 1208, the communication interface 1212, and the local control interface 1214 can be implemented as hardware and/or firmware units, software units, or combined hardware, firmware, and software units. For example, these components can include dedicated chips/circuits and/or can include software modules implemented as code stored in the one or more storage media of the control system 116 and running on the one or more hardware processors of the control system 116. Moreover, the elements of the control system 116 described herein can be combined with one another as aggregate units, and the control system need not include all elements described for the example of the control system 116 described in reference to FIGS. 1-12.

The power source 1206 can include a battery, such as a rechargeable battery. The power source 1206 provides power to the components of the opto-electronic system, such as the laser, the beam deflector, the control system, and the camera sensor.

The optional communication interface 1212 is configured to communicate with one or more remote and/or local devices. For example, the communication interface 1212 can receive commands to be implemented by the control system 116 and/or data to be stored on the control system 116. The remote and/or local devices can include, for example, smart phones, personal computers (e.g., laptops), and/or remote systems such as cloud computing systems or other remote servers. The communication interface 1212 can be configured to communicate over USB connectors, Ethernet connectors, or other network connection types, such as wireless connections (e.g., Bluetooth, Wi-Fi, and/or cellular data networks). In general, the communication interface 1212 can communicate over any data communication link(s) implemented via physical cables or wirelessly.

The optional local control interface 1214 is configured to receive user inputs, such as user inputs to control operation of the control system 116. For example, the local control interface 1214 can include one or more physically-adjustable control elements (e.g., buttons, switches, and/or dials) and/or a touchscreen controllable to display menus with which a user can interact to provide control inputs. In some implementations, the local control interface 1214 includes a display controllable to display information such as a current configuration of the opto-electronic system, images captures by a camera sensor, results of image analyses, etc.

The optional image processor 1208, in some implementations, is configured to obtain one or more images captured by the camera sensor (e.g., receive data representing the one or more images from the camera controller 1210) and analyze the one or more images to obtain one or more analysis results. For example, the image processor 1208 can be configured to identify an illumination pattern in an image (e.g., a dot array or an illumination line) and, based on deformations/shapes of the illumination pattern, determine a surface topology of an object onto which the illumination pattern is projected. Alternatively, or in addition, in some implementations captured images are transmitted to another device for analysis, e.g., using the communication interface 1212.

Figure 13:
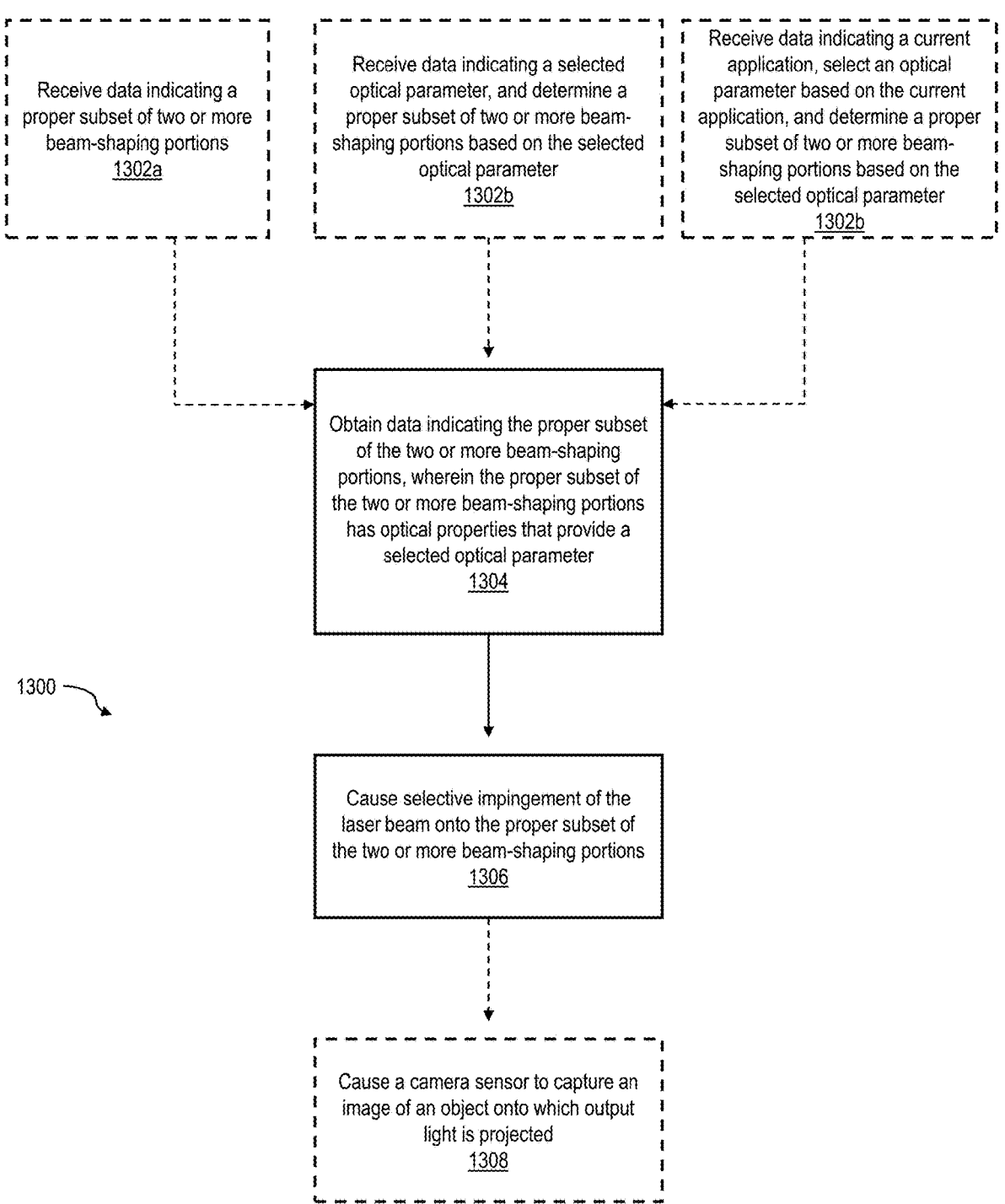
FIGS. 13-14 are diagrams illustrating examples of processes that can be performed using the opto-electronic systems described herein.

As shown in FIG. 13, in a process 1300 (e.g., performed by a control system such as control system 116 or element(s) thereof), a control system obtains data indicating a proper subset of two or more beam-shaping portions of an optical element (1304). The proper subset has optical properties that provide a selected optical parameter of output light. The selected optical parameter can be any of the optical parameters described above, such as a pattern formed by output light, a focal distance of the output light, a position (e.g., deflection direction/tilt angle) of the pattern, a polarization of the output light, an intensity of the output light, or another type of optical parameter.

The data indicating the proper subset can be obtained in one or more of various ways. In some implementations, the control system receives the data indicating the proper subset, such as from another device (1302a). For example, the control system 116 receives the data indicating the proper subset from the other device using the communication interface 1212, or from a user using the local control interface 1214. In some implementations, the control system receives data indicating the selected optical parameter, and the control system determines the proper subset that provides the selected optical parameter (1302b). For example, the control system 116 receives data indicating the selected optical parameter from another device using the communication interface 1212, or a user inputs the selected optical parameter using the local control interface 1214. The control system can determine the proper subset based on a stored correspondence between optical parameters and beam-shaping portions having optical properties that provide the optical parameters. For example, the control system can access a stored table, database, or other data structure that holds the stored correspondence.

As a non-limiting example, the control system receives data indicating that output light should include a first pattern and a second pattern superimposed on one another. The control system determines that a first beam-shaping portion modifies light to produce the first pattern and that a second beam-shaping portion modifies light to produce the second pattern. The first and second beam-shaping portions are the proper subset of beam-shaping portions. As another example, the control system receives data indicating that output light should project an illumination line focused on a particular focal plane. The control system determines that a first beam-shaping portion modifies light to produce illumination lines focused on the particular focal plane. The first beam-shaping portion is the proper subset of beam-shaping portions.

In some implementations, the control system receives data indicating a current application for which output light is being used, determines the selected optical parameter based on the current application, and determines the proper subset that provides the selected optical parameter (1302c). For example, the control system, using the communication interface 1212 or the local control interface 1214, can receive data indicating that the opto-electronic system is being used for a profilometry application, determine (e.g., based on a stored correspondence) that profilometry is conducted using a projected two-dimensional dot pattern, and determine the proper subset as one or more beam-shaping portions that produce the a two-dimensional dot pattern.

The example processes 1302a, 1302b, and 1302c can correspond to various processing capabilities and/or configurations of the control system 116. For example, in some implementations the control system 106 has relatively low-performance processing capabilities, and/or is not configured to make determinations based on overall optical applications, in which case the control system 116 may perform process 1302a. In some implementations, the control system has relatively high-performance processing capabilities and/or is highly integrated into an optical device so as to respond to high-level commands (e.g., "produce light for surface profiling an object 3 meters away"), in which case the control system may perform process 1302c. A control system may be configured to perform two or more of processes 1302a, 1302b, and 1302c in different use cases.

The control system causes selective impingement of the laser beam onto the proper subset of the two or more beam-shaping portions (1306). For example, the control system 116 can use the laser controller 1202 to switch the laser 102 on and off to selectively illuminate the proper subset; can use the laser controller 1202 to adjust an emission power (and, accordingly, output light intensity) of the laser 102; and/or can use the deflector controller 1204 to adjust a sweep frequency, a sweep speed, and/or a sweep angular range (either or both of total sweep angle and central axis of the sweeping) of the beam deflector 106, as described above in various implementations. The proper subset of the beam-shaping portions modifies the light to obtain output light having the selected optical parameter. The output light can then be utilized, e.g., projected onto an object.

In some implementations, determination of the proper subset of the two or more beam-shaping portions can include a determination of one or more illumination parameters associated with impingement on the proper subset. For example, the control system can determine specific position (s) on the proper subset at which the laser beam should impinge (at which an impingement path should be positioned) in order to provide the selected optical parameter. As described in reference to FIGS. 9A-9B, translation of the impingement path can cause corresponding translation of output light patterns. Accordingly, in some implementations, the selected optical parameter includes and/or is associated with a particular translation or position of an output light pattern, the control system determines the position(s) that provide the particular translation or position, and the control system controls the beam deflector and/or laser so that the impingement path matches the determined position(s).

As another example of determination of one or more illumination parameters, the control system can determine sweep speeds at which different portions of an impingement path should be swept, and/or can determine laser intensities to be impinged on portions of the impingement path, in order to increase and/or decrease imaged intensities of output illumination patterns as described in reference to FIGS. 3A-3B. For example, the selected optical parameter includes and/or is associated with a target intensity of one or more projected illumination patterns, and the control system controls the beam deflector and/or laser to achieve the target intensity by adjustment of sweep speed and/or laser beam emission power.

In some implementations, the control system causes a camera sensor to capture an image of the object onto which the output light is projected (1308). For example, the camera controller 1210 controls the camera sensor 320 to capture an image of the object when the output light is projected onto the object. The camera controller 1210 can then receive the captured image for analysis. Note that the camera controller 1210 and the camera sensor 320 need not be included in the control system 116 or in a device in which the control system 116 is included but, rather, in some implementations, can be included in another control system or another device.

The output light, modified by the beam-shaping portions to have one or more selected optical parameters, is suited for interoperability with the camera sensor and with subsequent image analysis. For example, the output light is focused at a focal plane that the camera sensor is configured to image, and/or the output light has a pattern that allows for a desired subsequent analysis of the object (e.g., a topological analysis), and/or the output light is directed, by translation by the impingement line or by impingement on selected beam-shaping portions, onto a portion of the object that is the focus of the subsequent analysis. Accordingly, results of optical analyses can be made more accurate under varying imaging conditions.

Figure 14:
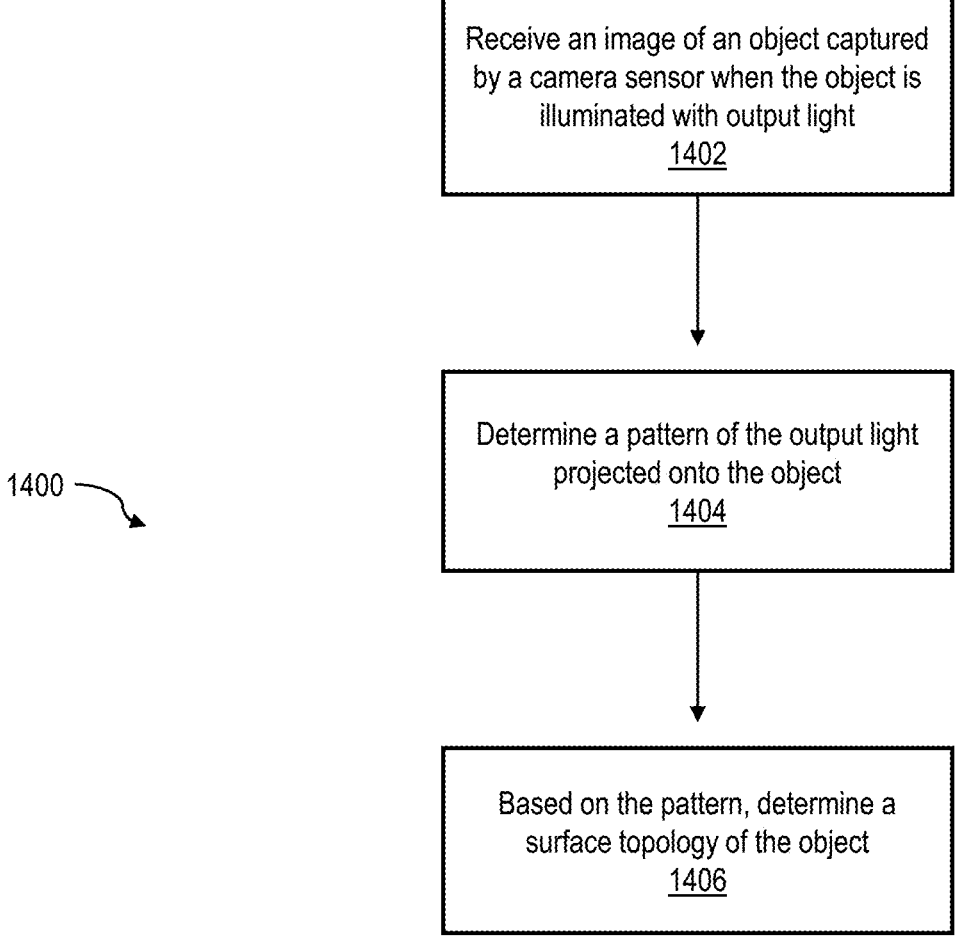

As shown in FIG. 14, in a process 1400 (e.g., performed by a control system such as control system 116 or element(s) thereof), an image of an object is received (1402). The image is captured by a camera sensor when the object is illuminated with output light that has been modified by a proper subset of two or more beam-shaping portions of an optical element, as described above. For example, camera controller 1210 receives the image from the camera sensor.

A pattern of the output light projected onto the object is determined (1404). For example, a shape, a length, a distortion, and/or another spatial characteristic of the output light projected onto the object, as captured in the image, is determined. This process can be performed by image processor 1208 in the control system 116, or can be performed by a separate processing system.

Based on the pattern, a surface topology of the object is determined (1406). For example, 2D or 3D profilometry can be performed using triangulation based on portions of the pattern. As another example, 2D or 3D stereometry can be performed, such as by determining distortion of a two-dimensional dot pattern projected on the object. In some implementations, the surface topology of the object is determined based on multiple images that correspond to projection of different patterns of output light, e.g., by impingement on different beam-shaping portions.

A few embodiments have been described in detail above, and various modifications are possible. The disclosed subject matter, including the functional operations described in this specification, can be implemented in electronic circuitry, computer hardware, firmware, or in combinations of them, such as the structural means disclosed in this specification and structural equivalents thereof.

The disclosed subject matter, including the functional operations described in this specification, can be implemented in electronic circuitry, computer hardware, firmware, or in combinations of them, such as the structural means disclosed in this specification and structural equivalents thereof.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An opto-electronic system comprising:
a laser operable to produce a laser beam;
an optical element comprising two or more beam-shaping portions, each of the two or more beam-shaping portions having a different optical property;
a beam deflector arranged to sweep the laser beam across the optical element to produce output light; and
electronics communicatively coupled with the laser, the beam deflector, or both the laser and the beam deflector, wherein the electronics are configured to cause selective impingement of the laser beam onto a proper subset of the two or more beam-shaping portions of the optical element to modify one or more optical parameters of the output light, and
wherein the electronics are configured to cause the laser beam to sweep along at least one continuous path on the proper subset of the two or more beam-shaping portions.

2. The opto-electronic system of claim 1, wherein the two or more beam-shaping portions comprise distinct beam-shaping portions.

3. The opto-electronic system of claim 2, wherein the distinct beam-shaping portions are arrayed in two dimensions.

4. The opto-electronic system of claim 1, wherein the electronics are configured to:
obtain data indicating the proper subset of the two or more beam-shaping portions, wherein the proper subset of the two or more beam-shaping portions has optical properties that provide a selected optical parameter; and
cause selective impingement of the laser beam onto the proper subset of the two or more beam-shaping portions by control of the laser, the beam deflector, or both the laser and the beam deflector.

5. The opto-electronic system of claim 1, wherein the electronics comprise a laser controller configured to:
switch the laser to be on when the beam deflector is in a configuration to deflect the laser beam onto the proper subset of the two or more beam-shaping portions; and
switch the laser to be off when the beam deflector is in a configuration to deflect the laser beam onto another beam-shaping portion of the optical element that is distinct from the proper subset of the two or more beam-shaping portions.

6. The opto-electronic system of claim 5, wherein the other beam-shaping portion is arranged between distinct sections of the proper subset of the two or more beam-shaping portions.

7. The opto-electronic system of claim 1, wherein the electronics comprise a laser controller configured to:
alter an emission power of the laser between different on-state powers as the beam deflector sweeps the laser beam, such that different sections of the proper subset of the two or more beam-shaping portions are impinged with different laser beam powers.

8. The opto-electronic system of claim 1, wherein the electronics comprise a deflector controller configured to:

alter a sweep range of the beam deflector from a first sweep range to a second, different sweep range, wherein the second sweep range deflects the laser beam onto the proper subset of the two or more beam-shaping portions.

9. The opto-electronic system of claim 1, comprising a lens arranged between the beam deflector and the optical element, the lens configured to collimate the laser beam deflected by the beam deflector to produce parallel laser beams for different deflection directions, the parallel laser beams oriented towards the optical element.

10. The opto-electronic system of claim 1, wherein the optical element comprises a single printed optic that includes the two or more beam-shaping portions.

11. The opto-electronic system of claim 1, wherein the different optical properties of the two or more beam-shaping portions comprise different focal distances.

12. The opto-electronic system of claim 1, wherein the one or more optical parameters comprise a shape of the output light as projected onto an object.

13. The opto-electronic system of claim 1, wherein the one or more optical parameters comprise a projection direction of the output light.

14. The opto-electronic system of claim 1, wherein the one or more optical parameters comprise a fan angle of the output light.

15. The opto-electronic system of claim 1, wherein the one or more optical parameters comprise a pattern of structured light in the output light.

16. The opto-electronic system of claim 15, wherein the pattern comprises at least one of a two-dimensional phase-shift pattern, a two-dimensional dot pattern, or a stripe pattern.

17. The opto-electronic system of claim 1, wherein the one or more optical parameters comprises a polarization of the output light.

18. The opto-electronic system of claim 1, wherein the output light is configured to form one or more illumination lines, and
wherein the one or more optical parameters comprise at least one of a number of the one or more illumination lines, positions of the one or more illumination lines, lengths of the one or more illumination lines, or spacings between adjacent illumination lines of the one or more illumination lines.

19. The opto-electronic system of claim 1, wherein the two or more beam-shaping portions comprise diffractive optical elements.

20. The opto-electronic system of claim 1, wherein the two or more beam-shaping portions comprise optical diffusers.

21. The opto-electronic system of claim 1, wherein the beam deflector comprises a micro-electromechanical system (MEMS) mirror.

22. The opto-electronic system of claim 1, comprising a camera sensor arranged to image an object onto which the output light is projected.

23. The opto-electronic system of claim 22, wherein the electronics comprise an image processor configured to:
receive an image captured by the camera sensor;
determine a pattern of the output light projected onto the object; and
based on the pattern, determine a surface topology of the object.

* * * * *